(12) United States Patent
Maeda et al.

(10) Patent No.: US 8,632,629 B2
(45) Date of Patent: *Jan. 21, 2014

(54) WATER-BASED INK SET FOR INK-JET RECORDING, INK-JET RECORDING METHOD, AND INK-JET RECORDING APPARATUS

(75) Inventors: Mitsunori Maeda, Nagoya (JP); Kazuma Goto, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 286 days.

This patent is subject to a terminal disclaimer.

(21) Appl. No.: 13/233,414

(22) Filed: Sep. 15, 2011

(65) Prior Publication Data
US 2012/0081452 A1 Apr. 5, 2012

(30) Foreign Application Priority Data

Sep. 30, 2010 (JP) .................................. 2010-223241
Sep. 9, 2011 (JP) .................................. 2011-196796

(51) Int. Cl.
*C09D 11/02* (2006.01)

(52) U.S. Cl.
USPC .................. 106/31.47; 106/31.48; 106/31.58

(58) Field of Classification Search
USPC ............ 106/31.47, 31.48, 31.58; 347/20, 100
See application file for complete search history.

(56) References Cited

U.S. PATENT DOCUMENTS

| 3,336,285 A | 8/1967 | Towne et al. |
| 3,950,321 A | 4/1976 | Dehnert et al. |

(Continued)

FOREIGN PATENT DOCUMENTS

| JP | 49-074718 | 7/1974 |
| JP | 51-083631 | 7/1976 |

(Continued)

OTHER PUBLICATIONS

Abstract of JP 2008/202011, Sep. 2008.*

*Primary Examiner* — Helene Klemanski
(74) *Attorney, Agent, or Firm* — Banner & Witcoff, Ltd.

(57) ABSTRACT

A water-based ink set for ink jet recording, includes: a water-based black ink which contains a black colorant, water, and a water-soluble organic solvent, the black colorant containing self-dispersible carbon black; and a water-based magenta ink which contains a magenta colorant, water, and a water-soluble organic solvent, the magenta colorant containing a dye represented by the general formula (1); wherein the water-soluble organic solvent includes a penetrant of which amount is 0.5% by weight to 3.5% by weight of the water-based magenta ink.

(1)

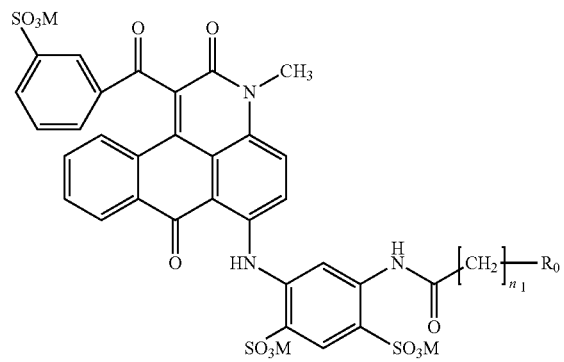

9 Claims, 1 Drawing Sheet

(56) References Cited

U.S. PATENT DOCUMENTS

| | | | |
|---|---|---|---|
| 4,068,085 A | 1/1978 | Ramanathan et al. | |
| 4,090,487 A | 5/1978 | Stumpp et al. | |
| 5,609,671 A | 3/1997 | Nagasawa | |
| 5,795,375 A | 8/1998 | Yamazaki et al. | |
| 5,837,045 A | 11/1998 | Johnson et al. | |
| 7,727,321 B2 * | 6/2010 | Goto et al. | 106/31.48 |
| 7,871,464 B2 * | 1/2011 | Ono et al. | 106/31.47 |
| 8,062,412 B2 * | 11/2011 | Aoyama et al. | 106/31.89 |
| 8,226,222 B2 * | 7/2012 | Kajiura et al. | 347/100 |
| 8,449,664 B2 * | 5/2013 | Maeda et al. | 106/31.47 |
| 8,460,449 B2 * | 6/2013 | Goto et al. | 106/31.48 |
| 2006/0201380 A1 | 9/2006 | Kowalski et al. | |
| 2007/0100023 A1 | 5/2007 | Burns et al. | |
| 2007/0100024 A1 | 5/2007 | Gu et al. | |
| 2008/0241398 A1 | 10/2008 | Kato et al. | |
| 2011/0128332 A1 | 6/2011 | Maeda et al. | |
| 2011/0128333 A1 | 6/2011 | Goto et al. | |
| 2012/0081453 A1 * | 4/2012 | Tsuzaka et al. | 347/20 |

FOREIGN PATENT DOCUMENTS

| | | | |
|---|---|---|---|
| JP | 52-046230 | | 4/1977 |
| JP | 06-019036 | | 1/1994 |
| JP | 08-003498 | | 1/1996 |
| JP | 09-137098 | | 5/1997 |
| JP | 2000-513396 | | 10/2000 |
| JP | 2007-217523 | | 8/2007 |
| JP | 2008-524400 | | 7/2008 |
| JP | 2008/202011 | * | 9/2008 |
| JP | 2008-246821 | | 10/2008 |
| JP | 2009-515007 | | 4/2009 |
| JP | 2009-155605 | | 7/2009 |
| JP | 2010-037505 | | 2/2010 |
| JP | 2001-111607 A | | 6/2011 |
| JP | 2011-111607 A | | 6/2011 |
| JP | 2011-111608 A | | 6/2011 |
| JP | 2011-111609 A | | 6/2011 |
| JP | 2011-111610 A | | 6/2011 |

* cited by examiner

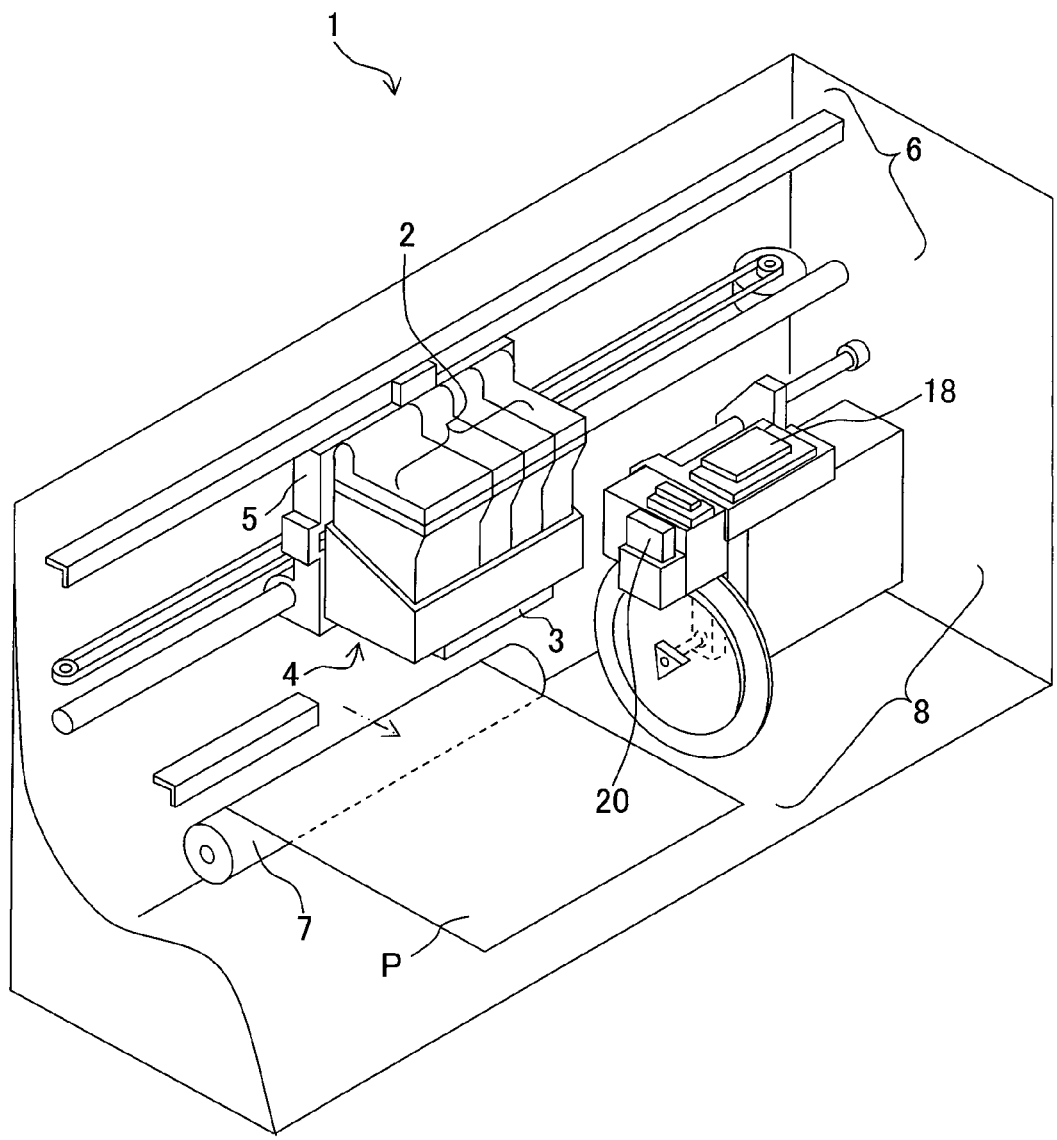

WATER-BASED INK SET FOR INK-JET RECORDING, INK-JET RECORDING METHOD, AND INK-JET RECORDING APPARATUS

CROSS REFERENCE TO RELATED APPLICATION

The present application claims priority from Japanese Patent Applications No. 2010-223241 filed on Sep. 30, 2010 and No. 2011-196796 filed on Sep. 9, 2011, the disclosure of which are incorporated herein by reference in its entirety.

BACKGROUND OF THE INVENTION

1. Field of the Invention

The present invention relates to a water-based ink set for ink-jet recording, an ink-jet recording method, and an ink-jet recording apparatus.

2. Description of the Related Art

In recent years, a water-based ink set for ink jet recording including a pigment black ink and dye color inks comes into widespread use. As a water-based magenta ink used in such a water-based ink set, an ink which includes C. I. Acid Red 52 or C. I. Acid Red 289 having superior color vividness or brightness (superior color developing properties) and superior jetting stability.

In the water-based ink set described above, the dye magenta ink itself is required to have sufficient weather resistance. Further, the water-based ink set is required to hardly cause bleeding between the pigment black ink and the dye magenta ink in a case that the pigment black ink is used with the dye magenta ink.

However, the dye magenta ink does not have sufficient weather resistance, and thus is not suitable for achieving both characteristics of the dye magenta ink itself and the water-based ink set.

SUMMARY OF THE INVENTION

An object of the present teaching is to provide a water-based ink set for ink jet recording which has superior color vividness or brightness (superior color developing properties), superior jetting stability, and superior weather resistance of a dye magenta ink and which includes a pigment black ink and the dye magenta ink which hardly cause bleeding therebetween.

According to a first aspect, there is provided a water-based ink set for ink-jet recording, including: a water-based black ink which contains a black colorant, water, and a water-soluble organic solvent, the black colorant containing self-dispersible carbon black; and a water-based magenta ink which contains a magenta colorant, water, and a water-soluble organic solvent, the magenta colorant containing a dye represented by the general formula (1); wherein the water-soluble organic solvent includes a penetrant of which amount is 0.5% by weight to 3.5% by weight of the water-based magenta ink,

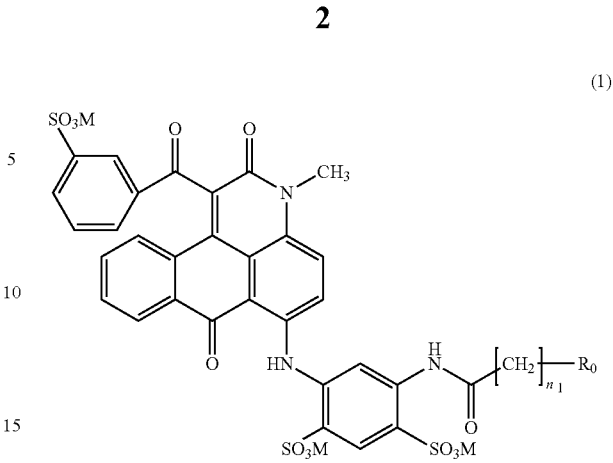

in the general formula (1), $n_1$ is 1 or 2; Ms each represent sodium or ammonium, and are identical to or different from each other; and $R_0$ represents a monoalkylamino group having 1 to 8 carbon atoms, substituted with a carboxyl group.

According to a second aspect, there is provided an ink-jet recording method for performing recording on a recording media including discharging, onto the recording medium, the water-based black ink and the water-based magenta ink of the water-based ink set for ink-jet recording of the first aspect.

According to a third aspect, there is provided an ink jet recording apparatus which performs recording on a recording medium including: an ink-set accommodating section which accommodates the water-based ink set for ink-jet recording of the first aspect; and an ink discharge mechanism which discharges, onto the recording medium, each of the water-based black ink and the water-based magenta ink of the water-based ink set for ink-jet recording.

BRIEF DESCRIPTION OF THE DRAWINGS

FIG. 1 is a schematic perspective view showing an exemplary construction of an ink jet recording apparatus of the present invention.

DESCRIPTION OF THE PREFERRED EMBODIMENTS

An explanation will be made about the water-based ink set for ink-jet recording of the present teaching (hereinafter, this may also be referred to simply as the "water-based ink set" or "ink-set"). The water-based ink set of the present teaching includes a water-based black ink and a water-based magenta ink.

(Water-Based Black Ink)

As mentioned above, the water-based black ink contains a black colorant, water, and a water-soluble organic solvent. The black colorant contains self-dispersible carbon black. The self-dispersible carbon black is dispersible in water without using any dispersing agent, for example, owing to the fact that at least one of hydrophilic functional group and the salt thereof including, for example, carbonyl group, hydroxyl group, carboxyl group, sulfo group, and phosphate group is introduced into the carbon black particles by the chemical bond directly or with any other group intervening therebetween. The water-based black ink may contain polymeric pigment dispersant; or it is allowable that the water-based black ink does not contain any polymeric pigment dispersant. In a case that the water-based black ink contains the polymeric pigment dispersant, it is preferable that the polymeric pigment dispersant is contained in the water-based black ink in an amount to an extent not affecting the viscosity of the water-based black ink. As described above, since the water-based black ink of the present teaching uses the self-dispersible carbon black, there is not any problem of the increase in viscosity which would be otherwise caused by the polymeric pigment dispersant; and the water-based black ink of the present teaching has excellent discharge stability and storage stability.

As the self-dispersible carbon black, for example, it is possible to use those of which carbon black is treated by methods described in Japanese Patent Application Laid-open No. 8-3498, Published Japanese Translation of PCT International Publication for Patent Application No. 2000-513396, Published Japanese Translation of PCT International Publication for Patent Application No. 2008-524400, Published Japanese Translation of PCT International Publication for Patent Application No. 2009-515007, etc. The carbon black, which is usable as the raw material for the self-dispersible carbon black, includes furnace black, lamp black, acetylene black, channel black, etc. The carbon black, which is especially suitable to perform the treatment, includes, for example, carbon blacks such as "MA8" and "MA100" produced by Mitsubishi Chemical Corporation and "Color Black FW200" produced by Degussa.

As the self-dispersible carbon black, for example, the commercially available product may be used. The commercially available product, includes, for example, "CAB-O-JET (trade name) 200", "CAB-O-JET (trade name) 250C", "CAB-O-JET (trade name) 260M", "CAB-O-JET (trade name) 270Y", "CAB-O-JET (trade name) 300", "CAB-O-JET (trade name) 400", "CAB-O-JET (trade name) 450C", "CAB-O-JET (trade name) 465M", and "CAB-O-JET (trade name) 470Y" produced by Cabot Specialty Chemicals; "BONJET (trade name) BLACK CW-2" and "BONJET (trade name) BLACK CW-3" produced by Orient Chemical Industries, Ltd.; and "LIOJET (trade name) WD BLACK 002C" produced by Toyo Ink Mfg. Co., Ltd.

The blending amount of the solid content of the self-dispersible carbon black with respect to the entire amount of the water-based black ink (pigment solid content amount) is not particularly limited, and can be appropriately determined depending on desired optical density or color (hue, tint), etc. The pigment solid content amount is, for example, 0.1% by weight to 20% by weight, preferably 1% by weight to 10% by weight, and more preferably 2% by weight to 8% by weight.

The black colorant may contain other pigments, dyes, etc., in addition to the self-dispersible carbon black, within a range in which the effect of the present teaching is not deteriorated.

The water is preferably ion-exchange water or purified water. The blending amount of the water (the proportion of the water in the water-based black ink) with respect to the entire amount of the water-based black ink is, for example, in the range of 10% by weight to 90% by weight, and preferably in the range of 40% by weight to 80% by weight. The proportion of the water in the water-based black ink may be, for example, a balance of the other components.

The water-soluble organic solvent includes, for example, a humectant which prevents the water-based black ink from drying at a nozzle tip portion of an ink-jet head and a penetrant which adjusts a drying rate of the water-based black ink on a recording medium.

The humectant is not particularly limited, and includes lower alcohols such as methyl alcohol, ethyl alcohol, n-propyl alcohol, isopropyl alcohol, n-butyl alcohol, sec-butyl alcohol, tert-butyl alcohol, and the like; amides such as dimethylformamide, dimethylacetamide, and the like; ketones such as acetone and the like; ketoalcohols such as diacetone alcohol and the like; ethers such as tetrahydrofuran, dioxane, and the like; polyalcohols such as polyalkylene glycol, alkylene glycol, glycerin, and the like; 2-pyrrolidone; N-methyl-2-pyrrolidone; 1,3-dimethyl-2-imidazolidinone; and the like. The polyalkylene glycol includes polyethylene glycol, polypropylene glycol, and the like. The alkylene glycol includes ethylene glycol, propylene glycol, butylene glycol, diethylene glycol, triethylene glycol, dipropylene glycol, tripropylene glycol, thiodiglycol, hexylene glycol, and the like. These humectants may be used alone or in a combination of two or more of them. Out of these, the humectant is preferably polyalcohol such as alkylene glycol, glycerin, or the like.

The blending amount of the humectant with respect to the entire amount of the water-based black ink is, for example, in the range of 0% by weight to 95% by weight, preferably in the range of 5% by weight to 80% by weight, and more preferably in the range of 5% by weight to 50% by weight.

The penetrant includes glycol ethers and the like. The glycol ethers include ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, tripropylene glycol-n-butyl ether, and the like. The penetrants may be used alone or in a combination of two or more of them.

The blending amount of the penetrant with respect to the entire amount of the water-based black ink is, for example, in the range of 0% by weight to 20% by weight, preferably in the range of 0.1% by weight to 15% by weight, and more preferably 0.5% by weight to 10% by weight.

The water-based black ink may further contain a conventionally known additive as required. The additive includes a surfactant, a pH adjuster, a viscosity modifier, a surface tension modifier, a mildew proofing agent, and the like. The viscosity modifier includes polyvinyl alcohol, cellulose, a water-soluble resin, and the like.

The water-based black ink can be prepared, for example, by uniformly mixing a black colorant, water, a water-soluble organic solvent with other addition components as required by a conventionally known method, and then removing sediments with a filter etc.

(Water-Based Magenta Ink)

As mentioned above, the water-based magenta ink contains a magenta colorant, water, and a water-soluble organic solvent. The magenta colorant contains a dye represented by the general formula (1). By containing the dye represented by the general formula (1) in the water-based magenta ink, it is possible to obtain the water-based magenta ink having superior color vividness or brightness and superior weather resistance. In the present teaching, "weather resistance" includes ozone resistance, light resistance, etc.

The dye represented by the general formula (1) may be a compound in which all of the three Ms are sodium (sodium salts), a compound in which all of the three Ms are ammonium (ammonium salts), or a compound in which one or two of the three Ms are sodium and the other(s) is(are) ammonium. The dye represented by the general formula (1) may be composed of one of the aforementioned compounds or may be a mixture containing two or more of the aforementioned compounds. Each of the Ms may be ionized in the water-based magenta ink to become an ion (at least one of $Na^+$ and $NH_4^+$).

Preferred examples of the dye represented by the general formula (1) include compounds represented by the magenta dyes (1-A) to (1-E) that are summarized in TABLE 1.

TABLE 1

|  | $n_1$ | M | $R_0$ |
|---|---|---|---|
| Dye (1-A) | 1 | Mixture of Na and $NH_4$ | —$NHCH_2COOH$ |
| Dye (1-B) | 1 | Mixture of Na and $NH_4$ | —$NH(CH_2)_5COOH$ |
| Dye (1-C) | 1 | Mixture of Na and $NH_4$ | —$NH(CH_2)_7COOH$ |
| Dye (1-D) | 2 | Mixture of Na and $NH_4$ | —$NHCH_2COOH$ |
| Dye (1-E) | 2 | Mixture of Na and $NH_4$ | —$NH(CH_2)_5COOH$ |

The dye represented by the general formula (1) can be produced according to a conventionally known method. An example of the method for producing the dye represented by the general formula (1) is as follows.

That is, first, a compound represented by the structural formula (1-b) is obtained by reaction of 1 mol of an anthraquinone compound represented by the structural formula (1-a) and 1.1 mol to 3 mol of benzoic acetic acid ethyl ester in a polar solvent such as xylene or the like in the presence of a basic compound such as sodium carbonate or the like at a temperature from 130° C. to 180° C. for 5 hours to 15 hours.

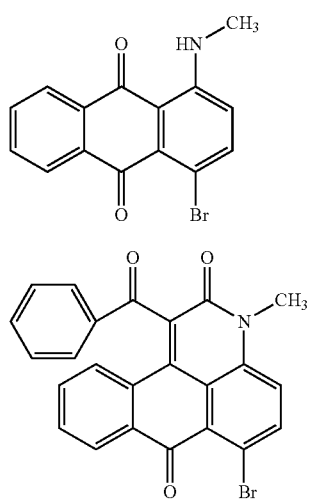

Next, 1 mol of the compound represented by the structural formula (1-b) obtained as above and 1 mol to 5 mol of meta aminoacetamido are condensed by the Ullmann reaction in an aprotic polar organic solvent such as N,N-dimethylformamide or the like in the presence of a base such as sodium carbonate or the like and a copper catalyst such as copper acetate or the like at a temperature from 110° C. to 150° C. for 2 hours to 6 hours, and thereby a compound represented by the structural formula (1-c) is obtained.

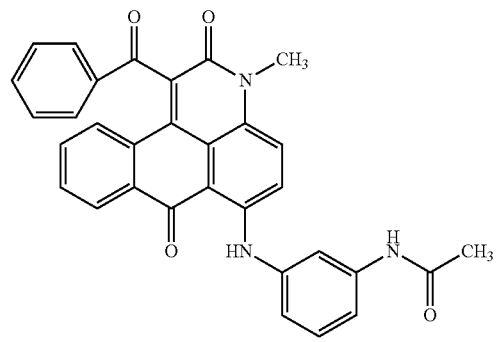

Then, a compound represented by the structural formula (1-d) is obtained by performing sulfonation of the compound represented by the structural formula (1-c) obtained as above in fuming sulfuric acid of 8% to 15% at a temperature from 50° C. to 120° C. and performing hydrolysis reaction of an acetylamino group simultaneously.

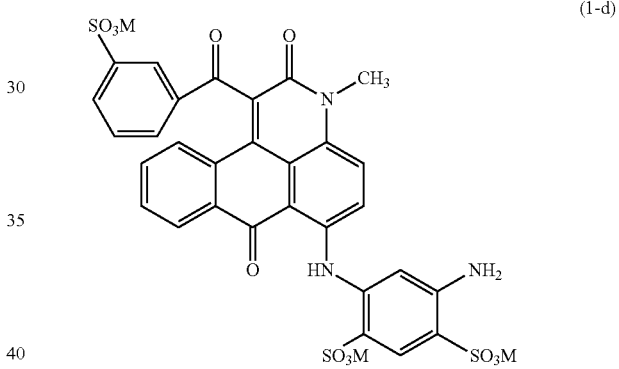

Then, a compound represented by the structural formula (1-f) is obtained by reaction of 1 mol of the compound represented by the structural formula (1-d) obtained as above and 2 mol to 2.5 mol of a compound represented by the structural formula (1-e) in water under reaction conditions in which the pH is from 2 to 9, the temperature is from 2° C. to 15° C., and the reaction time is from 30 minutes to 1 hour. The compound represented by the structural formula (1-f) obtained as above is reacted with 2 mol to 5 mol of a compound corresponding to $R_0$ (i.e., a compound represented by "$R_0$—H" or the like) under reaction conditions in which the pH is from 7 to 10, the temperature is from 20° C. to 90° C., and the reaction time is from 10 minutes to 10 hours. Thereby, a leaving group X in the structural formula (1-f) is substituted by $R_0$ and thus the dye represented by the general formula (1) is obtained.

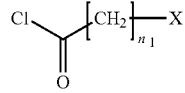

(1-f)

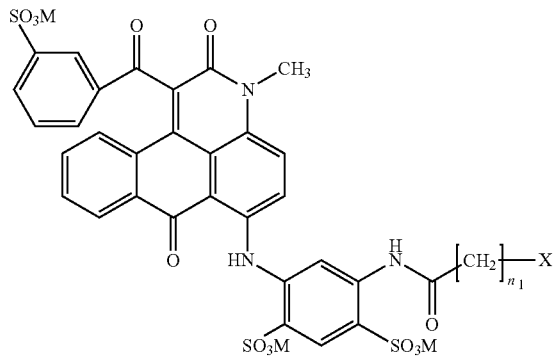

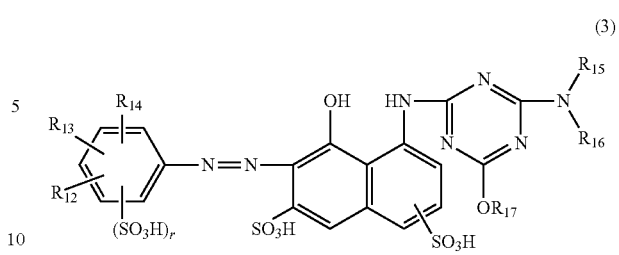

(3)

In the general formula (3),
r is 0, 1, or 2;

$R_{12}$, $R_{13}$, and $R_{14}$ each represent a substituted or unsubstituted alkyl group, a substituted or unsubstituted alkoxy group, a halogen atom, a hydrogen atom, a hydroxyl group, a substituted or unsubstituted carbamoyl group, a substituted or unsubstituted sulfamoyl group, a substituted or unsubstituted amino group, a nitro group, a sulfonate ester group, a substituted or unsubstituted alkylsulfonyl group, a substituted or unsubstituted arylsulfonyl group, a carboxyl group, or a carboxylate ester group, and $R_{12}$, $R_{13}$, and $R_{14}$ may be identical to or different from each other; and $R_{15}$, $R_{16}$, and $R_{17}$ each represent a hydrogen atom, a substituted or unsubstituted alkyl group, a substituted or unsubstituted alkenyl group, a substituted or unsubstituted aryl group, a substituted or unsubstituted aralkyl group, a substituted or unsubstituted alicyclic group, or a substituted or unsubstituted heterocyclic group, and $R_{15}$, $R_{16}$, and $R_{17}$ may be identical to or different from each other.

The blending amount of the dye represented by the general formula (1) is not particularly limited, and is, for example, in the range of 0.1% by weight to 10% by weight, preferably in the range of 1% by weight to 7% by weight, and more preferably in the range of 2% by weight to 6% by weight with respect to the entire amount of the water-based magenta ink.

The magenta colorant may be composed of only the dye represented by the general formula (1), or may further contain, for example, other dyes and pigments. The other dyes include dyes represented by the general formula (2), dyes represented by the general formula (3), C. I. Acid Red 1, C. I. Acid Red 254, etc. By using the dye represented by the general formula (1) with these other dyes, color vividness or brightness can be further improved.

In the general formula (2), the substituted or unsubstituted alkyl group is preferably an alkyl group having 1 to 6 carbon atoms. The substituted or unsubstituted alkyl group includes a methyl group, an ethyl group, a n-butyl group, an isopropyl group, a tert-butyl group, a hydroxyethyl group, a methoxyethyl group, a cyanoethyl group, a trifluoromethyl group, a 3-sulfopropyl group, a 4-sulfobutyl group, and the like. A substituent of the substituted alkyl group includes a hydroxyl group; an alkoxy group such as a methoxy group, an ethoxy group, or the like; a cyano group; a halogen atom such as a fluorine atom, a chlorine atom, a bromine atom, an iodine atom, or the like; an ionic hydrophilic group such as a carboxylate, a sulfonate, or the like; and the like.

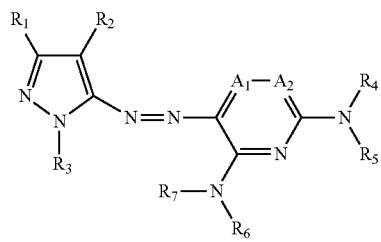

(2)

In the general formula (2), $R_1$ represents a hydrogen atom, a substituted or unsubstituted alkyl group, or a substituted or unsubstituted aryl group;

$R_2$ represents a hydrogen atom, a halogen atom, or a cyano group;

$R_3$ represents a hydrogen atom, a substituted or unsubstituted alkyl group, a substituted or unsubstituted aryl group, or a substituted or unsubstituted heterocyclic group;

$R_4$, $R_5$, $R_6$, and $R_7$ each represent a hydrogen atom, a substituted or unsubstituted alkyl group, a substituted or unsubstituted aryl group, a substituted or unsubstituted heterocyclic group, a substituted or unsubstituted sulfonyl group, or a substituted or unsubstituted acyl group, $R_4$, $R_5$, $R_6$, and $R_7$ may be identical to or different from each other, $R_4$ and $R_5$ are not both hydrogen atoms, and $R_6$ and $R_7$ are not both hydrogen atoms; and $A_1$ and $A_2$ are both substituted or unsubstituted carbon atoms, or one of $A_1$ and $A_2$ is a substituted or unsubstituted carbon atom and the other is a nitrogen atom.

In the general formula (2), the substituted or unsubstituted aryl group is preferably an aryl group having 6 to 12 carbon atoms. However, in the case of the substituted aryl group, the number of carbon atoms does not include the number of carbon atoms of its substituent(s). The substituted or unsubstituted aryl group includes a phenyl group, a naphthyl group, a p-tolyl group, a p-octylphenyl group, a mesityl group, a p-methoxyphenyl group, an o-chlorophenyl group, a m-(3-sulfopropylamino)phenyl group, and the like. The substituent of the substituted aryl group includes an alkyl group such as a methyl group, an ethyl group, an isopropyl group, a tert-butyl group, a n-octyl group, or the like; the same alkoxy group as that described above; the same halogen atom as that described above; an alkylamino group such as a methylamino group, a dimethylamino group, or the like; an amide group; a carbamoyl group; a sulfamoyl group; a sulfonamide group; a hydroxyl group; an ester group such as a methoxycarbonyl group, an ethoxycarbonyl group, or the like; the same ionic hydrophilic group as that described above; and the like.

In the general formula (2), the halogen atom includes a fluorine atom, a chlorine atom, a bromine atom, an iodine atom, and the like.

In the general formula (2), the substituted or unsubstituted heterocyclic group is preferably a 5- or 6-membered heterocyclic group. The substituted or unsubstituted heterocyclic group includes a 2-pyridyl group, a 2-thienyl group, a 2-thiazolyl group, a 2-benzothiazolyl group, a 2-furyl group, a 6-sulfobenzothiazolyl group, a 6-sulfonate benzothiazolyl group, and the like. The substituent of the substituted heterocyclic group includes an amide group, a carbamoyl group, a sulfamoyl group, a sulfonamide group, a hydroxyl group, the same ester group as that described above, the same ionic hydrophilic group as that described above, and the like.

In the general formula (2), the substituted or unsubstituted sulfonyl group includes a methylsulfonyl group, a phenylsulfonyl group, and the like. The substituent of the substituted sulfonyl group includes the same substituted or unsubstituted alkyl group as that described above, the same substituted or unsubstituted aryl group as that described above, and the like.

In the general formula (2), the substituted or unsubstituted acyl group is preferably an acyl group having 1 to 12 carbon atoms. However, in the case of the substituted acyl group, the number of carbon atoms does not include the number of carbon atoms of its substituent(s). The substituted or unsubstituted acyl group includes an acetyl group, a benzoyl group, a chloroacetyl group, and the like. The substituent of the substituted acyl group includes the same ionic hydrophilic group as that described above, and the like.

As described above, in the general formula (2), $A_1$ and $A_2$ are both substituted or unsubstituted carbon atoms, or one of $A_1$ and $A_2$ is a substituted or unsubstituted carbon atom and the other is a nitrogen atom. Preferably, $A_1$ and $A_2$ are both carbon atoms in view of the fact that better weather resistance can be obtained. The substituent bonded to the carbon atoms $A_1$ and $A_2$ includes an alkyl group having 1 to 3 carbon atoms, a carboxyl group, a carbamoyl group, a cyano group, and the like.

As described above, in the general formula (2), $R_4$ and $R_5$ are not both hydrogen atoms and $R_6$ and $R_7$ are not both hydrogen atoms. Moreover, in the general formula (2), the water solubility of the dye tends to be improved as the number of substitutions by a sulfo group or a carboxyl group is increased. Therefore, the number of these substitutions is preferably adjusted in accordance with needs.

One preferred dye represented by the general formula (2) is, for example, a dye represented by the general formula (2) wherein, in the general formula (2), $R_1$ is an alkyl group; $R_2$ is a cyano group; $R_3$ is a hydrogen atom or a substituted or unsubstituted heterocyclic group; $R_4$ is a hydrogen atom, a substituted or unsubstituted heterocyclic group or a substituted aryl group; $R_5$ and $R_6$ each are a substituted heterocyclic group or a substituted aryl group; $R_7$ is a hydrogen atom; $A_1$ is a substituted carbon atom; and $A_2$ is a substituted or unsubstituted carbon atom.

A more preferred dye represented by the general formula (2) is, for example, a dye represented by the general formula (2) wherein, in the general formula (2), $R_1$ is a tert-butyl group; $R_2$ is a cyano group; $R_3$ is a hydrogen atom or a benzothiazolyl group (preferably, a benzothiazole-2-yl group) optionally substituted by a sulfo group or an alkali metal sulfonate group; $R_4$ is a hydrogen atom, a benzothiazolyl group (preferably, a benzothiazole-2-yl group) optionally substituted by a sulfo group or an alkali metal sulfonate group, or a trialkylphenyl group (preferably, a mesityl group) substituted by a sulfo group or an alkali metal sulfonate group; $R_5$ and $R_6$ each are a monoalkylphenyl group, a dialkylphenyl group, or a trialkylphenyl group (preferably, a p-octylphenyl group or a mesityl group) optionally substituted by a sulfo group or an alkali metal sulfonate group or a benzothiazolyl group (preferably, a benzothiazole-2-yl group) substituted by a sulfo group or an alkali metal sulfonate group; $R_7$ is a hydrogen atom; $A_1$ is a substituted carbon atom; and $A_2$ is a carbon atom optionally substituted by a cyano group.

Preferred examples of the dye represented by the general formula (2) include compounds represented by the chemical formulae (2-A) to (2-F).

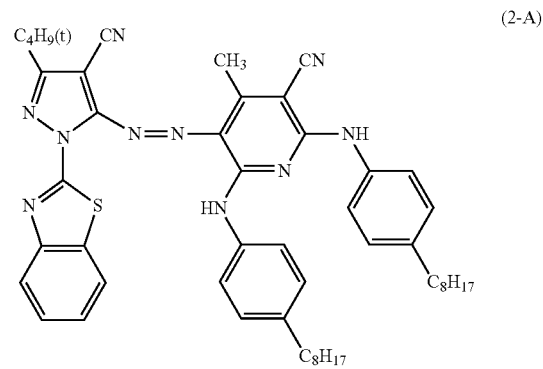

(2-A)

The compound represented by the chemical formula (2-A) is a compound, wherein, in the general formula (2), $R_1$ is a tert-butyl group; $R_2$ is a cyano group; $R_3$ is a benzothiazole-2-yl group; $R_4$ is a hydrogen atom; $R_5$ and $R_6$ each are a p-octylphenyl group; $R_7$ is a hydrogen atom; $A_1$ is a carbon atom substituted by a methyl group; and $A_2$ is a carbon atom substituted by a cyano group.

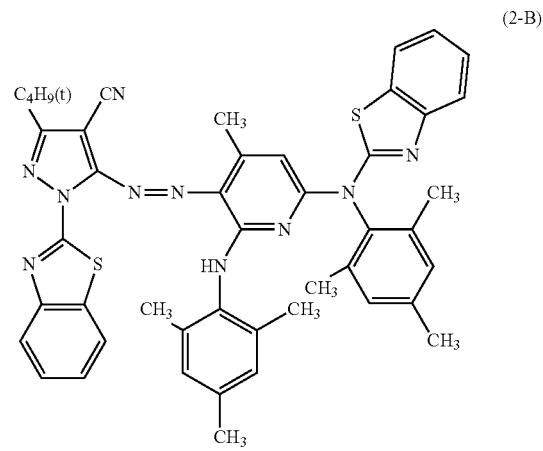

(2-B)

The compound represented by the chemical formula (2-B) is another compound, wherein, in the general formula (2), $R_1$ is a tert-butyl group; $R_2$ is a cyano group; $R_3$ and $R_4$ each are a benzothiazole-2-yl group; $R_5$ and $R_6$ each are a mesityl group; $R_7$ is a hydrogen atom; $A_1$ is a carbon atom substituted by a methyl group; and $A_2$ is a carbon atom.

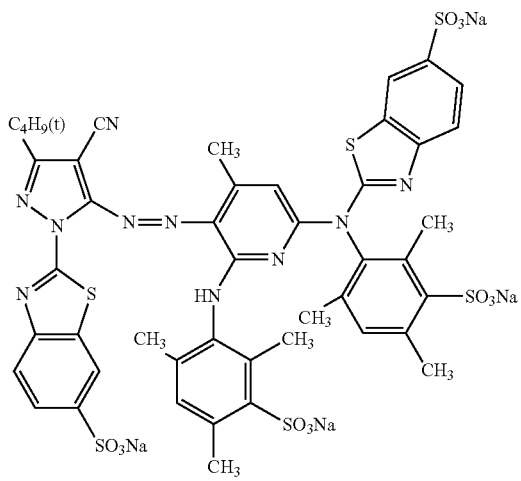

(2-C)

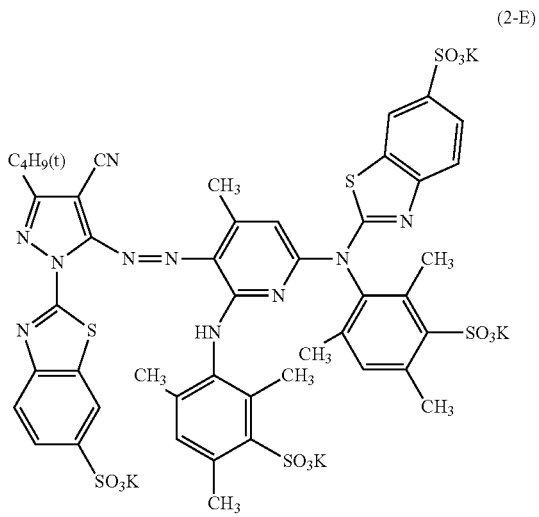

(2-E)

The compound represented by the chemical formula (2-C) is still another compound, wherein, in the general formula (2), $R_1$ is a tert-butyl group; $R_2$ is a cyano group; $R_3$ and $R_4$ each are a 6-sodium sulfonate benzothiazole-2-yl group; $R_5$ and $R_6$ each are a 3-sodium sulfonate mesityl group; $R_7$ is a hydrogen atom; $A_1$ is a carbon atom substituted by a methyl group; and $A_2$ is a carbon atom.

The compound represented by the chemical formula (2-E) is yet another compound, wherein, in the general formula (2), $R_1$ is a tert-butyl group; $R_2$ is a cyano group; $R_3$ and $R_4$ each are a 6-potassium sulfonate benzothiazole-2-yl group; $R_5$ and $R_6$ each are a 3-potassium sulfonate mesityl group; $R_7$ is a hydrogen atom; $A_1$ is a carbon atom substituted by a methyl group; and $A_2$ is a carbon atom.

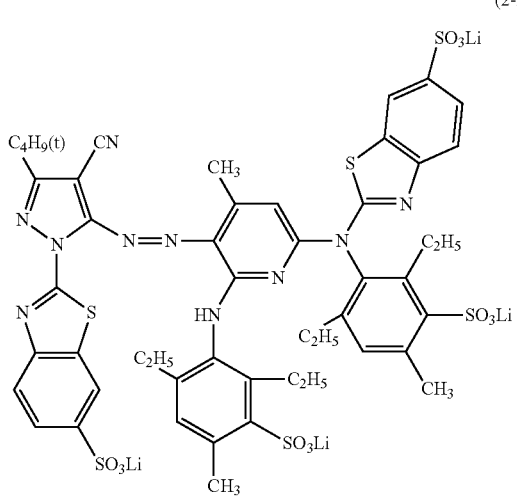

(2-D)

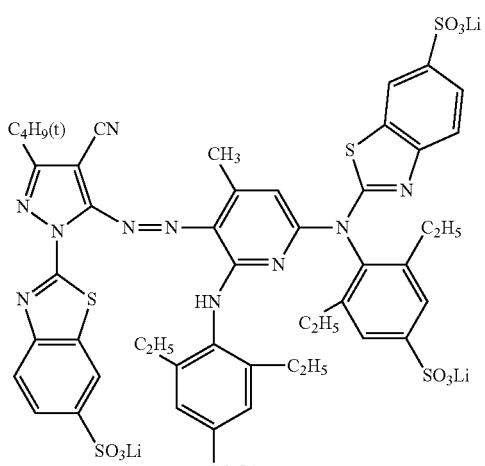

(2-F)

The compound represented by the chemical formula (2-D) is yet another compound, wherein, in the general formula (2), $R_1$ is a tert-butyl group; $R_2$ is a cyano group; $R_3$ and $R_4$ each are a 6-lithium sulfonate benzothiazole-2-yl group; $R_5$ and $R_6$ each are a 2,6-diethyl-4-methyl-3-lithium sulfonate phenyl group, $R_7$ is a hydrogen atom; $A_1$ is a carbon atom substituted by a methyl group; and $A_2$ is a carbon atom.

The compound represented by the chemical formula (2-F) is yet another compound, wherein, in the general formula (2), $R_1$ is a tert-butyl group; $R_2$ is a cyano group; $R_3$ and $R_4$ each are a 6-lithium sulfonate benzothiazole-2-yl group; $R_5$ and $R_6$ each are a 2,6-diethyl-4-lithium sulfonate phenyl group; $R_7$ is a hydrogen atom; $A_1$ is a carbon atom substituted by a methyl group; and $A_2$ is a carbon atom.

The dye represented by the general formula (2) can be produced, for example, according to the following steps (A) to (C).

Step (A)

Aminopyrazole represented by the chemical formula (2-a) is reacted with a diazotizating agent to form a diazonium salt. As the diazotizating agent, a dilute hydrochloric acid solution of sodium nitrite is preferable, and isopentyl nitrite, nitrosyl-sulfuric acid, and the like may also be employed.

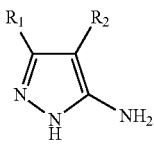
(2-a)

Each of the substituents $R_1$ and $R_2$ in the chemical formula (2-a) is the same as that described for the general formula (2). The aminopyrazole represented by the chemical formula (2-a) may be synthesized according to a method described in U.S. Pat. No. 3,336,285; "Heterocycles", 20, 519, (1983); Japanese Patent Publication No. 6 (1994)-19036; and the like.

Step (B)

Next, the diazonium salt formed in the step (A) is reacted with a pyridine-based coupling agent represented by the chemical formula (2-b) to form a compound represented by the chemical formula (2-c).

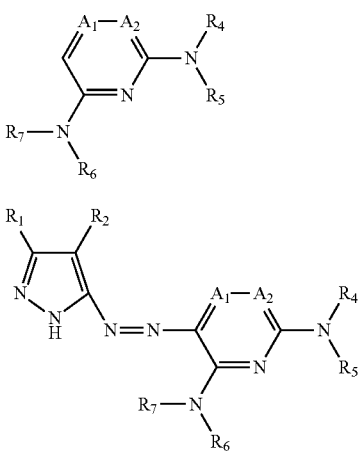

Each of the substituents $R_4$ to $R_7$ in the chemical formula (2-b) and each of the substituents $R_4$ to $R_7$ in the chemical formula (2-c) are the same as those described for the general formula (2). The pyridine-based coupling agent represented by the chemical formula (2-b) may be synthesized according to a method described in Japanese Patent Application Laid-open No. 51(1976)-83631, Japanese Patent Application Laid-open No. 49 (1974)-74718, Japanese Patent Publication No. 52 (1977)-46230, and the like.

Step (C)

The compound formed in the step (B) is reacted with an alkylating agent, an arylating agent or a heterylating agent in the presence of a base, and thereby the dye represented by the general formula (2) is obtained. As the base employed in this step, an organic base such as diisopropylethylamine or the like; an inorganic base such as potassium carbonate, sodium carbonate, sodium hydrogen carbonate, potassium hydrogen carbonate, sodium hydroxide, potassium hydroxide, or the like; and the like can be employed. The alkylating agent is a compound represented by "R—X". Here, R is an optionally substituted alkyl group. X is a halogen atom or $OSO_2R'$, wherein R' is an alkyl group or an aryl group such as a phenyl group or the like. The arylating agent is a compound represented by "Ar—X". Here, Ar is a phenyl group substituted by an electron attractive group (preferably, substituted by a substituent having a total Hammett's up value of 0.2 or more).

The heterylating agent is a compound represented by "Het-X". Here, Het is a hetero ring, and examples thereof include a 2-pyridyl group, a 2-thienyl group, a 2-thiazolyl group, a 2-benzothiazolyl group, a triazyl group, a 2-furyl group, and the like.

In the water-based magenta ink, in a case that the dye represented by the general formula (1) is used with the dye represented by the general formula (2), the blending amount of the dye represented by the general formula (1) is not particularly limited, and is, for example, in the range of 0.1% by weight to 10% by weight, preferably in the range of 0.4% by weight to 3.6% by weight, with respect to the entire amount of the water-based magenta ink. In a case that the dye represented by the general formula (1) is used with the dye represented by the general formula (2), the blending amount of the dye represented by the general formula (2) is not particularly limited, and is, for example, in the range of 0.1% by weight to 10% by weight, preferably in the range of 0.8% by weight to 4.8% by weight, with respect to the entire amount of the water-based magenta ink.

In the water-based magenta ink, in a case that the dye represented by the general formula (1) is used with the dye represented by the general formula (2), the weight ratio of the dye represented by the general formula (1) to the dye represented by the general formula (2) in the water-based magenta ink is preferably in the range of 60:40 to 20:80 (dye represented by the general formula (1): dye represented by the general formula (2)).

In the general formula (3), the substituted or unsubstituted alkyl group of each of $R_{12}$, $R_{13}$, and $R_{14}$ is preferably an alkyl group having 1 to 9 carbon atoms in total. The substituted or unsubstituted alkyl group includes a methyl group, an ethyl group, a n-propyl group, an isopropyl group, a n-butyl group, a trifluoromethyl group, a dimethylaminomethyl group, and the like. The substituent of the substituted alkyl group includes a hydroxyl group; an alkoxy group such as a methoxy group, an ethoxy group, or the like; a cyano group; a halogen atom such as a fluorine atom, a chlorine atom, a bromine atom, an iodine atom, or the like; an ionic hydrophilic group such as a carboxylate, a sulfonate, or the like; and the like.

In the general formula (3), the substituted or unsubstituted alkoxy group of each of $R_{12}$, $R_{13}$, and $R_{14}$ is preferably an alkoxy group having 1 to 9 carbon atoms in total. The substituted or unsubstituted alkoxy group includes a methoxy group, an isopropoxy group, a n-butoxy group, and the like.

In the general formula (3), the halogen atom of $R_{12}$, $R_{13}$, and $R_{14}$ includes a fluorine atom, a chlorine atom, a bromine atom, an iodine atom, and the like.

In the general formula (3), the substituted or unsubstituted carbamoyl group of $R_{12}$, $R_{13}$, and $R_{14}$ includes a carbamoyl group, an N,N-dimethylcarbamoyl group, a phenylcarbamoyl group, and the like.

In the general formula (3), the substituted or unsubstituted sulfamoyl group of $R_{12}$, $R_{13}$, and $R_{14}$ includes a sulfamoyl group, an N-methylsulfamoyl group, an N-ethylsulfamoyl group, an N-ethyl-N-phenylsulfamoyl group, an N,N-dimethylsulfamoyl group, a p-carboxyphenylsulfamoyl group, and the like.

In the general formula (3), the substituted or unsubstituted amino group of $R_{12}$, $R_{13}$, and $R_{14}$ includes an N-methylamino group, a carbamoylamino group, an N,N-diethylamino group, an acetylamino group, and the like.

In the general formula (3), the sulfonate ester group of $R_{12}$, $R_{13}$, and $R_{14}$ includes a phenoxysulfonyl group and the like.

In the general formula (3), the substituted or unsubstituted alkylsulfonyl group of $R_{12}$, $R_{13}$, and $R_{14}$ is preferably an alkylsulfonyl group having 1 to 9 carbon atoms in total. The substituted or unsubstituted alkylsulfonyl group includes a hydroxysulfonyl group and the like.

In the general formula (3), the substituted or unsubstituted arylsulfonyl group of $R_{12}$, $R_{13}$, and $R_{14}$ is preferably an arylsulfonyl group having 6 to 15 carbon atoms in total. The substituted or unsubstituted arylsulfonyl group includes a benzylsulfonyl group and the like.

In the general formula (3), the carboxylate ester group of $R_{12}$, $R_{13}$, and $R_{14}$ includes a methoxycarbonyl group and the like.

In the general formula (3), the substituted or unsubstituted alkyl group of $R_{15}$, $R_{16}$, and $R_{17}$ is preferably an alkyl group having 1 to 18 carbon atoms in total. The substituted or unsubstituted alkyl group includes an ethyl group, a n-butyl group, a n-octyl group, an ethylhexyl group, a hydroxyethyl group, a carboxypropyl group, a carboxycyclohexylmethyl group, a 1-carboxy-2-mercaptoethyl group, a 1-carboxy-2-carbamoyl-ethyl group, a 1-isopropyl-1-carboxymethyl group, a 1,2-dicarboxypropyl group, and the like. The substituent of the substituted alkyl group includes a hydroxyl group; an alkoxy group such as a methoxy group, an ethoxy group, or the like; a cyano group; a halogen atom such as a fluorine atom, a chlorine atom, a bromine atom, an iodine atom, or the like; an ionic hydrophilic group such as a carboxylate, a sulfonate, or the like; and the like.

In the general formula (3), the substituted or unsubstituted alkenyl group of $R_{15}$, $R_{16}$, and $R_{17}$ is preferably an alkenyl group having 2 to 18 carbon atoms in total. The substituted or unsubstituted alkenyl group includes a 2-methyl-1-propenyl group, a vinyl group, an allyl group, and the like.

In the general formula (3), the substituted or unsubstituted aryl group of $R_{15}$, $R_{16}$, and $R_{17}$ includes a 3,4-dicarboxyphenyl group, a 4-butylphenyl group, a 4-carboxyphenyl group, and the like. The substituent of the substituted aryl group includes, for example, the substituents described for the substituted alkyl group.

In the general formula (3), the substituted or unsubstituted aralkyl group of $R_{15}$, $R_{16}$, and $R_{17}$ includes a benzyl group, a 1-carboxy-2-phenyl-ethyl group, a 1-carboxy-2-hydroxyphenylethyl group, a 4-carboxybenzyl group, and the like.

In the general formula (3), the substituted or unsubstituted alicyclic group of $R_{15}$, $R_{16}$, and $R_{17}$ includes a cyclohexyl group, a 4-carboxycyclohexyl group, and the like.

In the general formula (3), the substituted or unsubstituted heterocyclic group of $R_{15}$, $R_{16}$, and $R_{17}$ includes a pyridyl group, a thiadiazolyl group, a benzothiazolyl group, a 2,2,6,6-tetramethylpiperidinyl group, and the like. The substituent of the substituted heterocyclic group includes, for example, the substituents described for the substituted alkyl group.

In the general formula (3), at least one of $R_{15}$, $R_{16}$, and $R_{17}$ may be an alkyl group, an alkenyl group, an aryl group, an alicyclic group, an aralkyl group, or a heterocyclic group substituted by one to four carboxyl groups or sulfamoyl groups.

In the general formula (3), $R_{15}$ and $R_{16}$ may each be a hydrogen atom or a tri-substituted phenyl group, and may be identical to or different from each other. Here, three substituents of the tri-substituted phenyl group each are a hydrogen atom, a halogen atom, a hydroxyl group, a substituted or unsubstituted alkyl group having 1 to 9 carbon atoms in total, a substituted or unsubstituted alkoxy group having 1 to 9 carbon atoms in total, a substituted or unsubstituted carbamoyl group, a substituted or unsubstituted sulfamoyl group, a substituted or unsubstituted amino group, a nitro group, a sulfonate ester group, or a carboxylate ester group. The aforementioned three substituents may be identical to or different from each other.

A preferred dye represented by the general formula (3) is, for example, a dye represented by the general formula (3) wherein, in the general formula (3), at least one of $R_{15}$, $R_{16}$, and $R_{17}$ is an alkyl group, an alkenyl group, an aryl group, an aralkyl group, or a cyclohexyl group substituted by one to four carboxyl groups or sulfamoyl groups.

With respect to the dye represented by the general formula (3), the number of sulfo groups, carboxyl groups, and/or these salts contained in its structure is preferably six or less in total, more preferably five or less in total, and much more preferably four or less in total. Furthermore, the dye represented by the general formula (3) may be used in a free acid form. However, when the dye represented by the general formula (3) is obtained in a salt form at the time of producing, it may be used without conversion or may be converted into a desired salt form. Moreover, with respect to the dye represented by the general formula (3), a part of the acid groups may be in a salt form, and both a salt-form dye and a free acid-form dye may be present. Such a salt form includes salts of alkali metals such as Na, Li, K, and the like; salts of ammonium optionally substituted by an alkyl group or a hydroxyalkyl group; salts of organic amines; and the like. The organic amine includes a lower alkylamine, a hydroxy-substituted lower alkylamine, a carboxy-substituted lower alkylamine, a polyamine having 2 to 10 alkyleneimine units each having 2 to 4 carbon atoms, and the like. The number of the types of these salts used is not limited to 1, but a plurality of types of the salts may be present.

Another preferred magenta dye represented by the general formula (3) is, for example, a dye represented by the general formula (3) wherein, in the general formula (3), r is 0; $R_{12}$ is a carboxyl group, a carbamoyl group, a trifluoromethyl group, or a sulfamoyl group; $R_{13}$, $R_{14}$, and $R_{16}$ each are a hydrogen atom; $R_{15}$ is a phenyl group optionally substituted by a carboxyl group or a sulfamoyl group, or a carboxy alkyl group; and $R_{17}$ is a hydrogen atom or an alkyl group.

Preferred Examples of the dye represented by the general formula (3) include compounds represented by the chemical formulae (3-A) to (3-E).

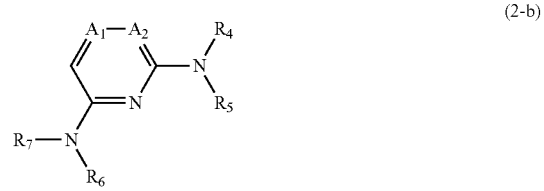

(2-b)

The compound represented by the chemical formula (3-A) is a compound, wherein, in the general formula (3), r is 0; $R_{12}$ is a carboxyl group at the 2-position of a phenyl group bonded to an azo group; $R_{13}$, $R_{14}$ and $R_{16}$ each are a hydrogen atom; $R_{15}$ is a 2-carboxyphenyl group; and $R_{17}$ is a hydrogen atom. In the compound represented by the chemical formula (3-A), sulfonic acids at the 3-position and 6-position of a naphthalene ring are ammonium salts.

(3-B)

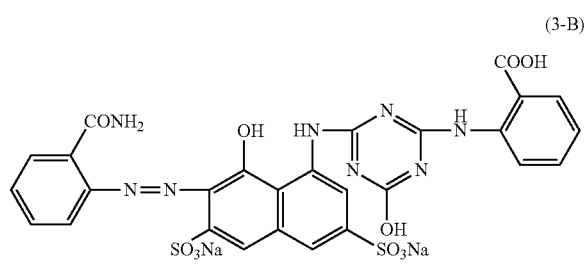

The compound represented by the chemical formula (3-B) is another compound, wherein in the general formula (3), r is 0; $R_{12}$ is a carbamoyl group at the 2-position of a phenyl group bonded to an azo group; $R_{13}$, $R_{14}$ and $R_{16}$ each are a hydrogen atom; $R_{15}$ is a 2-carboxyphenyl group; and $R_{17}$ is a hydrogen atom. In the compound represented by the chemical formula (3-B), sulfonic acids at the 3-position and 6-position of a naphthalene ring are sodium salts.

(3-C)

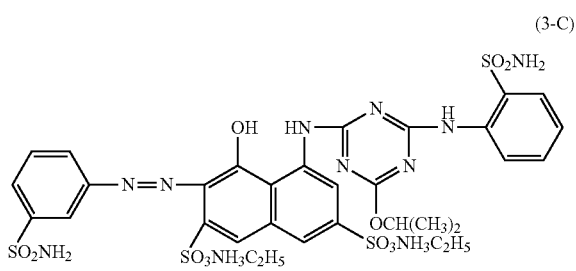

The compound represented by the chemical formula (3-C) is still another compound, wherein in the general formula (3), r is 0; $R_{12}$ is a sulfamoyl group at the 3-position of a phenyl group bonded to an azo group; $R_{13}$, $R_{14}$ and $R_{16}$ each are a hydrogen atom; $R_{15}$ is a 2-sulfamoylphenyl group; and $R_{17}$ is an isopropyl group. In the compound represented by the chemical formula (3-C), sulfonic acids at the 3-position and 6-position of a naphthalene ring are ethylammonium salts.

(3-D)

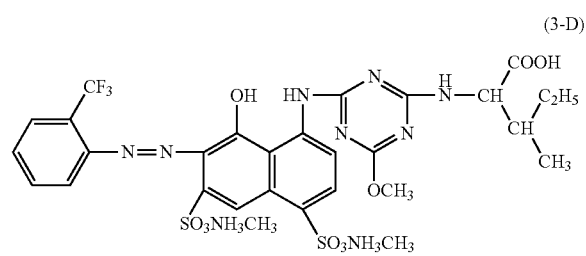

The compound represented by the chemical formula (3-D) is yet another compound, wherein in the general formula (3), r is 0; $R_{12}$ is a trifluoromethyl group at the 2-position of a phenyl group bonded to an azo group; $R_{13}$, $R_{14}$ and $R_{16}$ each are a hydrogen atom; $R_{15}$ is a 1-carboxy-2-methylbutyl group; and $R_{17}$ is a methyl group. In the compound represented by the chemical formula (3-D), sulfonic acids at the 3-position and 6-position of a naphthalene ring are methylammonium salts.

(3-E)

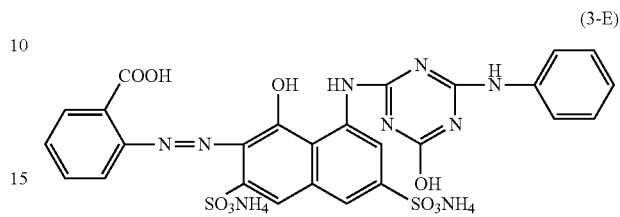

The compound represented by the chemical formula (3-E) is yet another compound, wherein, in the general formula (3), r is 0; $R_{12}$ is a carboxyl group at the 2-position of a phenyl group bonded to an azo group; $R_{13}$, $R_{14}$ and $R_{16}$ each are a hydrogen atom; $R_{15}$ is a phenyl group; and $R_{17}$ is a hydrogen atom. In the compound represented by the chemical formula (3-E), sulfonic acids at the 3-position and 6-position of a naphthalene ring are ammonium salts.

The dye represented by the general formula (3) can be produced according to a conventionally known method. For example, the dye represented by the general formula (3) can be produced according to the following steps (A) to (C).

Step (A)

A monoazo compound is produced from 2-aminobenzoic acid (anthranilic acid) and 1-amino-8-hydroxy-3,6-naphthalenedisulfonic acid (H acid) according to a routine method (see, for example, Yutaka Hosoda, SHIN SENRYO KAGAKU (New Dye Chemistry), pp. 396 to 409, published by Gihodo (Dec. 21, 1973)) through diazotization and coupling reaction.

Step (B)

Next, the resultant monoazo compound is added to a cyanuric chloride suspension and allowed to react for several hours. At this time, the reaction mixture is maintained under conditions in which the pH is from 4 to 6 and the temperature is from 0° C. to 5° C. Subsequent to this reaction, an aqueous solution of 2-aminobenzoic acid (anthranilic acid) is added to the reaction mixture at room temperature in order to prevent the reaction mixture from becoming alkaline, and the reaction mixture is subjected to a condensation reaction for several hours. Subsequently, an aqueous solution of sodium hydroxide of 25% is added to the reaction mixture at a temperature from 50° C. to 60° C. to make the reaction mixture strong alkaline, thereby effecting a hydrolysis reaction. Thus, the reaction is completed.

Step (C)

After completion of the reaction, the reaction mixture is cooled and is subjected to salting out with sodium chloride, and thereby the dye represented by the general formula (3) is obtained.

C. I. Acid Red 1 is a dye represented by the structural formula (4).

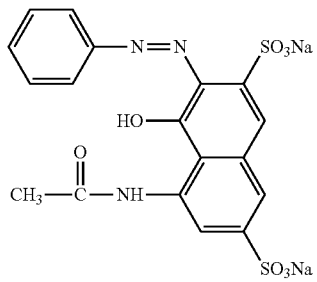

(4)

In the water-based magenta ink, the dye represented by the general formula (1) is used with at least one dye selected from the group consisting of the dye represented by the general formula (3), C. I. Acid Red 1, and C. I. Acid Red 254, the blending amount of the dye represented by the general formula (1) is not particularly limited, and is, for example, in the range of 0.1% by weight to 10% by weight, preferably in the range of 1.4% by weight to 5.4% by weight with respect to the entire amount of the water-based magenta ink. The blending amount of the at least one dye is not particularly limited, and is, for example, in the range of 0.05% by weight to 5% by weight, preferably in the range of 0.2% by weight to 1.8% by weight, with respect to the entire amount of the water-based magenta ink.

In the water-based magenta ink, the dye represented by the general formula (1) is used with the at least one dye, the weight ratio of the dye represented by the general formula (1) to the at least one dye in the water-based magenta ink is preferably in the range of 60:40 to 90:10 (dye represented by the general formula (1): at least one dye).

The entire blending amount of the dye represented by the general formula (1), the dye represented by the general formula (2), the dye represented by the general formula (3), C. I. Acid Red 1, and C. I. Acid Red 254 is not particularly limited, and is preferably in the range of 0.1% by weight to 10% by weight, more preferably in the range of 1% by weight to 7% by weight, and much more preferably in the range of 2% by weight to 6% by weight with respect to the entire amount of the water-based magenta ink.

The water and the blending amount of the water are similar to those described for the water-based black ink.

As described above, the water-soluble organic solvent includes the penetrant. The penetrant is similar to the penetrant described for the water-based black ink. Out of these, dipropylene glycol-n-propyl ether, triethylene glycol-n-butyl ether, tripropylene glycol methyl ether, propylene glycol-n-propyl ether, and/or tripropylene glycol-n-butyl ether is/are preferable. The penetrants may be used alone or in a combination of two or more of them.

The blending amount of the penetrant with respect to the entire amount of the water-based magenta ink is in the range of 0.5% by weight to 3.5% by weight. By making the blending amount of the penetrant be not more than 3.5% by weight, it is possible to obtain the water-based magenta ink having superior jetting stability besides superior color vividness or brightness and superior weather resistance. Further, by making the blending amount of the penetrant be not less than 0.5% by weight, it is possible to obtain the water-based magenta ink having the three capabilities described above and to obtain the water-based ink set which hardly causes bleeding between the water-based black ink and the water-based magenta ink.

The water-soluble organic solvent may contain the humectant besides the penetrant. The humectant and the blending amount of the humectant are the same as those described for the water-based black ink.

The water-based magenta ink may further contain a conventionally known additive as required. The additive is also similar to that described for the water-based black ink.

The water-based magenta ink can be prepared, for example, by uniformly mixing a magenta colorant, water, a water-soluble organic solvent with other addition components as required by a conventionally known method, and then removing sediments with a filter etc.

The water-based ink set for ink-jet recording according to the present teaching may be configured of only the water-based black ink and the water-based magenta ink, or may further include a water-based ink of a color other than the two colors. The water-based ink of a color other than the two colors includes a water-based yellow ink, a water-based cyan ink, a water-based red ink, a water-based green ink, a water-based blue ink, water-based light inks with low concentrations of colorant (a water-based light black ink, a water-based light magenta ink, a water-based light yellow ink, a water-based light cyan ink, a water-based light red ink, a water-based light green ink, a water-based light blue ink, and the like), and the like. The water-based ink set according to the present teaching preferably includes the water-based yellow ink and the water-based cyan ink so that the water-based ink set is applicable to full-color recording.

The water-based ink set for ink-jet recording as described above has superior color vividness or brightness, superior jetting stability, and superior weather resistance of the dye magenta ink and hardly causes bleeding between the pigment black ink and the dye magenta ink.

Next, the water-based ink set for ink-jet recording according to the present teaching can be provided as an ink cartridge. For example, the ink cartridge of the present teaching is an ink cartridge which includes containing portions for a water-based black ink and a water-based magenta ink respectively, wherein the water-based black ink and the water-based magenta ink are the aforementioned water-based black ink and the aforementioned water-based magenta ink in the aforementioned water-based ink set for ink-jet recording of the present teaching, respectively. The ink cartridge of the present teaching may further include a containing portion for the water-based ink of a color other than the aforementioned two colors.

The ink cartridge of the present teaching is preferably an ink cartridge assembly obtained by assembling plural ink cartridges each having a containing portion for a water-based ink of each color. However, the present teaching is not limited thereto. The ink cartridge of the present teaching may be an integrated ink cartridge in which the inside is partitioned so that containing portions of water-based inks of the respective colors are formed. As the body of the ink cartridge of the present teaching, for example, a conventionally known body can be used.

Next, explanation will made about the ink-jet recording method and the ink jet recording apparatus of the present teaching.

The ink-jet recording method of the present teaching is an ink-jet recording method for performing recording by discharging a water-based ink constituting or constructing a water-based ink set onto a recording medium in accordance with an ink-jet system, wherein the water-based ink set is the aforementioned water-based ink set for ink-jet recording of the present teaching.

The ink jet recording apparatus of the present teaching is an ink jet recording apparatus including an ink-set accommodating section and an ink discharge mechanism, wherein the water-based ink set for ink jet recording of the present teaching is accommodated in the ink-set accommodating section; the water-based ink set for ink-jet recording includes a water-based black ink and a water-based magenta ink; and each of the water-based black ink and the water-based magenta ink is discharged onto a recording medium by the ink discharge mechanism.

The ink-jet recording method of the present teaching can be performed using the ink jet recording apparatus of the present teaching etc. The recording includes printing text (character, letter), printing image or picture, printing, etc.

As shown in FIG. 1, an ink-jet recording apparatus 1 includes four ink cartridges 2, an ink discharging mechanism (ink-jet head) 3, a head unit 4, a carriage 5, a drive unit 6, a platen roller 7, and a purge unit 8 as main components.

The four ink cartridges 2 contain water-based inks of four colors, namely, black, magenta, yellow, and cyan, respectively. The water-based black ink and the water-based magenta ink are the water-based black ink and the water-based magenta ink constituting the aforementioned water-based ink set of the present teaching, respectively. As a water-based ink other than the water-based black ink and the water-based magenta ink, a typical water-based ink may be used. The ink jet head 3 performs recording on a recording medium P such as a recording paper. The head unit 4 is provided with the ink-jet head 3. The four ink cartridges 2 and the head unit 4 are mounted on the carriage 5. The driving unit 6 reciprocates the carriage 5 in a linear direction. As the driving unit 6, it is possible to use, for example, a conventionally known driving unit (see, for example, Japanese Patent Application laid-open No. 2008-246821). The platen roller 7 extends in the reciprocating direction of the carriage 5 and is arranged to face or be opposite to the ink-jet head 3.

The recording medium P is supplied or fed from a paper feeding cassette (not shown) arranged at a side of or at a position below the ink jet recording apparatus 1. The recording medium P is introduced between the ink-jet head 3 and the platen roller 7. Then, a predetermined recording is performed on the introduced recording medium P with the ink discharged from the ink-jet head 3. Afterwards, the recording medium P is discharged from the ink-jet recording apparatus 1. In FIG. 1, the paper feeding mechanism and discharging mechanism for the recording medium P are omitted.

The purge device 8 sucks unsatisfactory or degraded ink containing air bubbles etc. accumulated in the ink-jet head 3. As the purge device 8, it is possible to use, for example, a conventionally known purge device (for example, see Japanese Patent Application laid-open No. 2008-246821).

A wiper member 20 is provided on the purge device 8, at a position on the side of the platen roller 7 such that the wiper member 20 is adjacent to the purge device 8. The wiper member 20 is formed to have a spatula form, and wipes a nozzle-formation surface of the ink-jet head 3 accompanying with the movement (reciprocating movement) of the carriage 5. In FIG. 1, a cap 18 is provided to cover a plurality of nozzles of the ink-jet head 3 which is returned to a reset position upon completion of the printing, so as to prevent the ink from drying.

In the ink-jet recording apparatus, the four ink cartridges may be provided on a plurality of carriages. Alternatively, the ink cartridges may be arranged and fixed inside the ink-jet recording apparatus, rather than being provided on the carriage(s). In such an aspect, for example, the ink cartridges and the head unit which is provided on the carriage are connected with a tube, etc., and the inks are supplied from the ink cartridges to the head unit via the tube.

EXAMPLES

Next, examples of the present teaching will be explained together with comparative examples. Note that the present teaching is not limited to the examples, the comparative examples which will be described below.
[Preparation of Water-Based Black Ink]

Components except for a water dispersion of the self-dispersible carbon black (self-dispersible carbon black water dispersion), which were included in the water-based black ink composition components (TABLE 2 and TABLE 3), were mixed uniformly to obtain ink solvents. Subsequently, the ink solvents were each added to the water dispersion of self-dispersible carbon black, followed by being mixed uniformly. After that, obtained mixtures were each filtrated through a cellulose acetate membrane filter (pore size 3.00 vim) manufactured by Toyo Roshi Kaisha, Ltd., and thus water-based black inks Bk1 to Bk2 were obtained.
[Preparation of Water-Based Magenta Ink]

Water-based magenta inks M1 to M21 and M22c to M35c were obtained by mixing their ink components (TABLE2 and TABLE 3) uniformly and then filtering the resultant mixtures respectively through a hydrophilic polytetrafluoroethylene (PTFE) type membrane filter (pore diameter: 0.20 μm) manufactured by Toyo Roshi Kaisha, Ltd. In TABLE 2 and TABLE 3, dyes (1-A) to (1-E) are compounds represented by the magenta dyes (1-A) to (1-E) shown in TABLE 1, respectively, dyes (2-A) to (2-E) are compounds represented by the chemical formulae (2-A) to (2-E), respectively, and dyes (3-A) to (3-C) are compounds represented by the chemical formulae (3-A) to (3-C), respectively.

Examples 1 to 21 and Comparative Examples 1 to 14

Configuration of Water-Based Ink Set for Ink Jet Recording

As shown in Tables 2 and 3, water-based ink sets for ink jet recording were configured by combining a water-based black ink and a water-based magenta ink.
[Evaluation of Water-Based Ink Set for Ink-Jet Recording]

With respect to the water-based ink sets of examples and comparative examples, (a) jetting stability evaluation of the water-based magenta ink (magenta jetting stability evaluation) (b) color developing properties evaluation of the water-based magenta ink (magenta color developing properties evaluation), (c) weather resistance evaluation of the water-based magenta ink (magenta weather resistance evaluation), (d) bleeding evaluation, and (e) comprehensive evaluation were conducted by the following methods. Samples used for (b) magenta color developing properties evaluation and (c) magenta weather resistance evaluation were prepared as follows.
[Preparation of Samples]

First, ink cartridges were filled with the water-based magenta inks constituting the water-based ink sets of examples and comparative examples. Next, the ink cartridges were attached to a digital multi-function center DCP-385C carried with an ink-jet printer, manufactured by Brother Industries, Ltd. Then, a single color gradation sample of each of the water-based magenta inks was printed on a glossy photo paper BP71GA manufactured by Brother Industries, Ltd.

(e) Evaluation of Magenta Jetting Stability

With respect to the water-based magenta inks constituting the respective water-based ink sets of examples and comparative examples, continuous recording of 100 million dots (approximately 30,000 sheets) was carried out on office paper W (recording paper) manufactured by FUJITSU CoWorCo LIMITED using the digital multi-function center DCP-385C carried with the ink-jet printer. The result of the continuous recording was evaluated according to the following evaluation criteria. The term "non-ejection" denotes a state that the nozzle of the ink-jet head is clogged and the water-based magenta ink is not ejected. The term "a bending of jetting (a deflection in direction of jetting)" denotes a state that the nozzle of the ink jet head is partially clogged and thereby the water-based ink is jetted not perpendicularly to the recording paper but obliquely thereto.

Criteria for Evaluation of Magenta Jetting Stability

AA: Neither non-ejection nor the bending of jetting occurred during the continuous recording.

A: Non-ejection and/or the bending of jetting occurred to a small extent during the continuous recording, but the non-ejection and/or the bending of jetting was restored by five purges or fewer.

B: Non-ejection and/or the bending of jetting occurred during the continuous recording, but the non-ejection and/or the bending of jetting was restored by ten purges or fewer.

C: Non-ejection and/or the bending of jetting occurred to a large extent during the continuous recording, and the non-ejection and/or the bending of jetting was not restored by ten purges.

(b) Evaluation of Magenta Color Developing Properties

Whether or not the magenta color is sufficiently expressed was evaluated according to the following criteria by observing each of the gradation samples by visual check.

Criteria for Evaluation of Magenta Color Developing Properties

AA: the magenta color was expressed sufficiently

A: the magenta color was expressed

C: the magenta color was not expressed (c) Evaluation of Magenta Weather Resistance Magenta weather resistance was evaluated in accordance with evaluation of ozone resistance and evaluation of light resistance described below.

(c-1) Evaluation of Ozone Resistance

Among the gradation samples, a patch having an initial OD value of 1.0 was used as an evaluation sample. The OD value was measured with a spectrophotometer, Spectrolino (light source: $D_{65}$; observer: 2°; and status A), manufactured by GretagMacbeth. Using an ozone weather meter, OMS-H, manufactured by SUGA TEST INSTRUMENTS CO., LTD, the patch was allowed to leave 40 hours under the conditions that the ozone concentration was 1 ppm, the temperature in the chamber was 24° C., and the relative humidity in the chamber was 60%. Next, the OD value of the patch after being allowed to leave was measured in the same manner as described above. Then, the OD value decrease rate (%) was determined according to the following equation (I). The smaller the OD value decrease rate, the less the deterioration in image quality, which means the ozone resistance is higher.

$$\text{OD value decrease rate (\%)} = \{(X-Y)/X\} \times 100 \quad (I)$$

X: 1.0 (initial OD value)
Y: OD value after being allowed to leave
(c-2) Evaluation of Light Resistance Among the gradation samples, a patch having an initial OD value of 1.0 was used as an evaluation sample. The OD value was measured with a spectrophotometer, Spectrolino (light source: $D_{65}$; observer: 2°; and status A), manufactured by GretagMacbeth. Using a super xenon weather meter, SX75, manufactured by SUGA TEST INSTRUMENTS CO., LTD, the patch was irradiated with light from a xenon lamp for 100 hours under the conditions that the temperature in the chamber was 23° C., the relative humidity in the chamber was 50%, and the illuminance was 81 klx. Next, the OD value of the patch after irradiation was measured in the same manner as described above. Then, the OD value decrease rate (%) was determined according to the following equation (II). The smaller the OD value decrease rate, the less the deterioration in image quality, which means the light resistance is higher.

$$\text{OD value decrease rate (\%)} = \{(X-Y)/X\} \times 100 \quad (II)$$

X: 1.0 (initial OD value)
Y: OD value after irradiation

Magenta light resistance was evaluated according to the following evaluation criteria.

Criteria for Evaluation of Magenta Weather Resistance

AA: OD value decrease rates of the evaluation of ozone resistance and the evaluation of light resistance were less than 20%.

A: OD value decrease rates of the evaluation of ozone resistance and the evaluation of light resistance were 20% or more and less than 30%

B: OD value decrease rates of the evaluation of ozone resistance and the evaluation of light resistance were 30% or more and less than 40%

C: OD value decrease rates of the evaluation of ozone resistance and the evaluation of light resistance were 40% or more (d) Evaluation of Bleeding Evaluation samples were prepared as follows. That is, two magenta portions formed by using the water-based magenta inks constituting the respective water-based ink sets of examples and comparative examples, were formed on three types of regular paper sheets (Rey Copy paper manufactured by International Paper, Business manufactured by XEROX, and Recycled Supreme manufactured by XEROX), by using the digital multi-function center DCP-385C carried with the ink-jet printer. Subsequently, a patch, in which a black line using one of the water-based black inks constituting the respective water-based ink sets of examples and comparative examples was formed, was recorded at a boundary portion of the two magenta portions. With respect to the bleeding in the evaluation sample, Raggedness was measured by the hand-held image analysis system "PIAS (trade name)-II" manufactured by Quality Engineering Associates Inc. (QEA) and was evaluated according to the following evaluation criteria. The measurement of Raggedness was performed three times per each regular paper sheet in conformity with ISO-13660. As for the measurement result of each regular paper sheet, an average value of values obtained by three times measurements was rounded off all fractions. Further, "an average (Raggedness) of the three types of regular paper sheets" described in the following criteria for evaluation of bleeding was obtained as follows. That is, the respective average values of the three types of regular paper sheets (value before being rounded) were summed up; the summed value was divided three to obtain an average value of the measurement results of the three types of regular paper sheets; and the average value was rounded off all fractions.

Criteria for Evaluation of Bleeding

AA: Average Raggedness of the three types of regular paper sheets was less than 30 μm A: Average Raggedness of the three types of regular paper sheets was 30 μm or more and less than 33 μm B: Average Raggedness of the three types of regular paper sheets was 33 μm or more and less than 36 μm
C: Average Raggedness of the three types of regular paper sheets was 36 μm or more (e) Comprehensive Evaluation With respect to the respective water-based ink sets, a comprehensive evaluation was made according to the following evaluation criteria based on the results of the evaluations (a) to (d).

Criteria for Comprehensive Evaluation

G: All of the evaluation results were A or more.
NG: Any one of the evaluation results was B or less.

The configurations and the evaluation results of the respective water-based ink sets of examples are shown in Table 2. Further, the configurations and the evaluation results of the respective water-based ink sets of comparative examples are shown in Table 3.

TABLE 2

| | | | | EXAMPLES | | | | | | |
|---|---|---|---|---|---|---|---|---|---|---|
| | | | | EX. 1 | EX. 2 | EX. 3 | EX. 4 | EX. 5 | EX. 6 | EX. 7 |
| Water-based magenta ink | | | | M1 | M 2 | M 3 | M 4 | M 5 | M 6 | M 7 |
| Water-based magenta ink composition (wt %) | Dye (1) | Dye (1-A) | | 4.0 | — | — | — | — | 4.0 | — |
| | | Dye (1-B) | | — | 4.0 | — | — | — | — | 4.0 |
| | | Dye (1-C) | | — | — | 4.0 | — | — | — | — |
| | | Dye (1-D) | | — | — | — | 4.0 | — | — | — |
| | | Dye (1-E) | | — | — | — | — | 4.0 | — | — |
| | Dye (2) | Dye (2-A) | | — | — | — | — | — | — | — |
| | | Dye (2-B) | | — | — | — | — | — | — | — |
| | | Dye (2-C) | | — | — | — | — | — | — | — |
| | | Dye (2-D) | | — | — | — | — | — | — | — |
| | | Dye (2-E) | | — | — | — | — | — | — | — |
| | Dye (3) | Dye (3-A) | | — | — | — | — | — | — | — |
| | | Dye (3-B) | | — | — | — | — | — | — | — |
| | | Dye (3-C) | | — | — | — | — | — | — | — |
| | C.I. Acid Red 1 | | | — | — | — | — | — | — | — |
| | C.I. Acid Red 254 | | | — | — | — | — | — | — | — |
| | Glycerin | | | 27.0 | 27.0 | 27.0 | 27.0 | 27.0 | 27.0 | 27.0 |
| | Dipropylene glycol-n-propyl ether | | | 2.0 | 0.5 | 3.5 | 2.0 | — | — | — |
| | Triethylenglycol-n-butylether | | | — | — | — | — | 2.0 | — | — |
| | Tripropylene glycol methyl ether | | | — | — | — | — | — | 2.0 | — |
| | Propylene glycol-n-propyl ether | | | — | — | — | — | — | — | 2.0 |
| | Tripropylene glycol-n-butyl ether | | | — | — | — | — | — | — | — |
| | OLFIN (trade mark) E1010 (*1) | | | 0.2 | 0.2 | 0.2 | 0.2 | 0.2 | 0.2 | 0.2 |
| | Water | | | balance | balance | balance | balance | balance | balance | balance |
| Water-based black ink | | | | Bk1 | Bk1 | Bk1 | Bk2 | Bk1 | Bk1 | Bk1 |
| Water-based black ink composition (wt %) | CAB-O-JET (trade mark) 300 (*2) | | | 26.7 (4.0) | 26.7 (4.0) | 26.7 (4.0) | — | 26.7 (4.0) | 26.7 (4.0) | 26.7 (4.0) |
| | CAB-O-JET (trade mark) 200 (*3) | | | — | — | — | 20.0 (4.0) | — | — | — |
| | Glycerin | | | 27.0 | 27.0 | 27.0 | 27.0 | 27.0 | 27.0 | 27.0 |
| | Dipropylene glycol-n-propyl ether | | | 0.9 | 0.9 | 0.9 | 0.9 | 0.9 | 0.9 | 0.9 |
| | OLFIN (trade mark) E1010 (*1) | | | 0.2 | 0.2 | 0.2 | 0.2 | 0.2 | 0.2 | 0.2 |
| | Water | | | balance | balance | balance | balance | balance | balance | balance |
| Evaluation | Magenta jetting stability evaluation | | | AA | A | A | AA | AA | AA | AA |
| | Magenta color developing properties evaluation | | | A | A | A | A | A | A | A |
| | Magenta weather resistance evaluation | | | AA | AA | AA | AA | AA | AA | AA |
| | Bleeding evaluation | | | AA | A | AA | AA | AA | AA | AA |
| | Comprehensive evaluation | | | G | G | G | G | G | G | G |
| | | | | EXAMPLES | | | | | | |
| | | | | EX. 8 | EX. 9 | EX. 10 | EX. 11 | EX. 12 | EX. 13 | EX. 14 |
| Water-based magenta ink | | | | M8 | M 9 | M 10 | M 11 | M12 | M13 | M 14 |
| Water-based magenta ink composition (wt %) | Dye (1) | Dye (1-A) | | — | 2.0 | — | — | — | — | 2.0 |
| | | Dye (1-B) | | — | — | 2.5 | — | — | — | — |
| | | Dye (1-C) | | 4.0 | — | — | 3.0 | — | — | — |
| | | Dye (1-D) | | — | — | — | — | 3.5 | — | — |
| | | Dye (1-E) | | — | — | — | — | — | 3.0 | — |
| | Dye (2) | Dye (2-A) | | — | 2.0 | — | — | — | — | — |
| | | Dye (2-B) | | — | — | — | — | — | — | 2.0 |
| | | Dye (2-C) | | — | — | — | — | — | — | — |
| | | Dye (2-D) | | — | — | — | — | — | — | — |
| | | Dye (2-E) | | — | — | — | — | — | — | — |

TABLE 2-continued

| | | | | | | | | | |
|---|---|---|---|---|---|---|---|---|---|
| | | Dye (3) | Dye (3-A) | — | — | 1.5 | — | — | — | — |
| | | | Dye (3-B) | — | — | — | — | — | 1.0 | — |
| | | | Dye (3-C) | — | — | — | — | — | — | — |
| | | C.I. Acid Red 1 | | — | — | — | 1.0 | — | — | — |
| | | C.I. Acid Red 254 | | — | — | — | — | 0.5 | — | — |
| | | Glycerin | | 27.0 | 27.0 | 27.0 | 27.0 | 27.0 | 27.0 | 27.0 |
| | | Dipropylene glycol-n-propyl ether | | 2.0 | 2.0 | 2.0 | 2.0 | 2.0 | 2.0 | 0.5 |
| | | Triethylenglycol-n-butylether | | — | — | — | — | — | — | — |
| | | Tripropylene glycol methyl ether | | — | — | — | — | — | 2.0 | — |
| | | Propylene glycol-n-propyl ether | | — | — | — | — | — | — | 2.0 |
| | | Tripropylene glycol-n-butyl ether | | 2.0 | — | — | — | — | — | — |
| | | OLFIN (trade mark) E1010 (*1) | | 0.2 | 0.2 | 0.2 | 0.2 | 0.2 | 0.2 | 0.2 |
| | | Water | | balance | balance | balance | balance | balance | balance | balance |
| Water-based black ink | | | | Bk1 | Bk1 | Bk1 | Bk1 | Bk1 | Bk1 | Bk1 |
| Water-based black ink composition (wt %) | | CAB-O-JET (trade mark) 300 (*2) | | 26.7 (4.0) | 26.7 (4.0) | 26.7 (4.0) | 26.7 (4.0) | 26.7 (4.0) | 26.7 (4.0) | 26.7 (4.0) |
| | | CAB-O-JET (trade mark) 200 (*3) | | — | — | — | — | — | — | — |
| | | Glycerin | | 27.0 | 27.0 | 27.0 | 27.0 | 27.0 | 27.0 | 27.0 |
| | | Dipropylene glycol-n-propyl ether | | 0.9 | 0.9 | 0.9 | 0.9 | 0.9 | 0.9 | 0.9 |
| | | OLFIN(trade mark) E1010 (*1) | | 0.2 | 0.2 | 0.2 | 0.2 | 0.2 | 0.2 | 0.2 |
| | | Water | | balance | balance | balance | balance | balance | balance | balance |
| Evaluation | | Magenta jetting stability evaluation | | AA | AA | AA | AA | AA | AA | A |
| | | Magenta color developing properties evaluation | | A | AA | AA | AA | AA | AA | AA |
| | | Magenta weather resistance evaluation | | AA | AA | A | A | A | A | AA |
| | | Bleeding evaluation | | AA | AA | AA | AA | AA | AA | A |
| | | Comprehensive evaluation | | G | G | G | G | G | G | G |

| | | | | EXAMPLES | | | | | | |
|---|---|---|---|---|---|---|---|---|---|---|
| | | | | EX. 15 | EX. 16 | EX. 17 | EX. 18 | EX. 19 | EX. 20 | EX. 21 |
| Water-based magenta ink | | | | M15 | M16 | M17 | M18 | M19 | M20 | M21 |
| Water-based magenta ink composition (wt %) | Dye (1) | Dye (1-A) | | — | — | — | — | 2.5 | — | — |
| | | Dye (1-B) | | 2.0 | — | — | — | — | 2.5 | — |
| | | Dye (1-C) | | — | 2.0 | — | — | — | — | 2.5 |
| | | Dye (1-D) | | — | — | 2.0 | — | — | — | — |
| | | Dye (1-E) | | — | — | — | 2.5 | — | — | — |
| | Dye (2) | Dye (2-A) | | — | — | — | — | — | — | — |
| | | Dye (2-B) | | — | — | — | — | — | — | — |
| | | Dye (2-C) | | 2.0 | — | — | — | — | — | — |
| | | Dye (2-D) | | — | 2.0 | — | — | — | — | — |
| | | Dye (2-E) | | — | — | 2.0 | — | — | — | — |
| | Dye (3) | Dye (3-A) | | — | — | — | — | 1.5 | — | — |
| | | Dye (3-B) | | — | — | — | — | — | 1.5 | — |
| | | Dye (3-C) | | — | — | — | 1.5 | — | — | 1.5 |
| | | C.I. Acid Red 1 | | — | — | — | — | — | — | — |
| | | C.I. Acid Red 254 | | — | — | — | — | — | — | — |
| | | Glycerin | | 27.0 | 27.0 | 27.0 | 27.0 | 27.0 | 27.0 | 27.0 |
| | | Dipropylene glycol-n-propyl ether | | 3.5 | 2.0 | — | 0.5 | 3.5 | 2.0 | — |
| | | Triethylenglycol-n-butylether | | — | — | 2.0 | — | — | — | 2.0 |
| | | Tripropylene glycol methyl ether | | — | — | — | — | — | — | — |
| | | Propylene glycol-n-propyl ether | | — | — | — | — | — | — | — |
| | | Tripropylene glycol-n-butyl ether | | — | — | — | — | — | — | — |
| | | OLFIN (trade mark) E1010 (*1) | | 0.2 | 0.2 | 0.2 | 0.2 | 0.2 | 0.2 | 0.2 |
| | | Water | | balance | balance | balance | balance | balance | balance | balance |
| Water-based black ink | | | | Bk1 | Bk2 | Bk1 | Bk1 | Bk1 | Bk2 | Bk1 |
| Water-based black ink composition (wt %) | | CAB-O-JET (trade mark) 300 (*2) | | 26.7 (4.0) | — | 26.7 (4.0) | 26.7 (4.0) | 26.7 (4.0) | — | 26.7 (4.0) |
| | | CAB-O-JET (trade mark) 200 (*3) | | — | 20.0 (4.0) | — | — | — | 20.0 (4.0) | — |
| | | Glycerin | | 27.0 | 27.0 | 27.0 | 27.0 | 27.0 | 27.0 | 27.0 |
| | | Dipropylene glycol-n-propyl ether | | 0.9 | 0.9 | 0.9 | 0.9 | 0.9 | 0.9 | 0.9 |

TABLE 2-continued

|  |  | | | | | | | |
|---|---|---|---|---|---|---|---|---|
|  | OLFIN (trade mark) E1010 (*1) | 0.2 | 0.2 | 0.2 | 0.2 | 0.2 | 0.2 | 0.2 |
|  | Water | balance | balance | balance | balance | balance | balance | balance |
| Evaluation | Magenta jetting stability evaluation | A | AA | AA | A | A | AA | AA |
|  | Magenta color developing properties evaluation | AA | AA | AA | AA | AA | AA | AA |
|  | Magenta weather resistance evaluation | AA | AA | AA | A | A | A | A |
|  | Bleeding evaluation | AA | AA | AA | A | AA | AA | AA |
|  | Comprehensive evaluation | G | G | G | G | G | G | G |

(*1): Acetylene glycol surfactant (ethylene oxide adduct (10 mol) of diol, Nissin Chemical Industry Co., Ltd.)
(*2): Self-dispersible carbon black dispersion, manufactured by Cabot Specialty Chemicals; carbon black concentration: 15% by weight, number in parenthesis indicates pigment solid content amount
(*3): Self-dispersible carbon black dispersion, manufactured by Cabot Specialty Chemicals; carbon black concentration: 20% by weight, number in parenthesis indicates pigment solid content amount

TABLE 3

|  |  |  |  | Comprehensive | | | | | | |
|---|---|---|---|---|---|---|---|---|---|---|
|  |  |  |  | COM. 1 | COM. 2 | COM. 3 | COM. 4 | COM. 5 | COM. 6 | COM. 7 |
| Water-based magenta ink |  |  |  | M22c | M23c | M24c | M25c | M26c | M27c | M28c |
| Water-based magenta ink composition (wt %) | Dye (1) | Dye (1-A) |  | — | 4.0 | — | — | — | — | — |
|  |  | Dye (1-B) |  | — | — | — | — | — | — | — |
|  |  | Dye (1-E) |  | 4.0 | — | — | — | — | — | — |
|  | Dye (2) | Dye (2-B) |  | — | — | 4.0 | — | — | — | — |
|  |  | Dye (2-C) |  | — | — | — | 4.0 | — | — | — |
|  |  | Dye (2-D) |  | — | — | — | — | — | — | — |
|  |  | Dye (2-E) |  | — | — | — | — | — | — | — |
|  | Dye (3) | Dye (3-C) |  | — | — | — | — | 4.0 | — | — |
|  | C.I. Acid Red 1 |  |  | — | — | — | — | — | 4.0 | — |
|  | C.I. Acid Red 254 |  |  | — | — | — | — | — | — | 4.0 |
|  | C.I. Acid Red 52 |  |  | — | — | — | — | — | — | — |
|  | C.I. Acid Red 289 |  |  | — | — | — | — | — | — | — |
|  | Glycerin |  |  | 27.0 | 27.0 | 27.0 | 27.0 | 27.0 | 27.0 | 27.0 |
|  | Dipropylene glycol-n-propyl ether |  |  | 0.2 | 4.0 | 2.0 | 4.5 | 2.0 | 2.0 | 2.0 |
|  | Triethylenglycol-n-butylether |  |  | — | — | — | — | — | — | — |
|  | Tripropylene glycol methyl ether |  |  | — | — | — | — | — | — | — |
|  | Propylene glycol-n-propyl ether |  |  | — | — | — | — | — | — | — |
|  | Tripropylene glycol-n-butyl ether |  |  | — | — | — | — | — | — | — |
|  | OLFIN (trade mark) E1010 (*1) |  |  | 0.2 | 0.2 | 0.2 | 0.2 | 0.2 | 0.2 | 0.2 |
|  | Water |  |  | balance | balance | balance | balance | balance | balance | balance |
| Water-based black ink |  |  |  | Bk1 | Bk1 | Bk1 | Bk1 | Bk1 | Bk1 | Bk1 |
| Water-based black ink composition (wt %) | CAB-O-JET (trade mark) 300 (*2) |  |  | 26.7 (4.0) | 26.7 (4.0) | 26.7 (4.0) | 26.7 (4.0) | 26.7 (4.0) | 26.7 (4.0) | 26.7 (4.0) |
|  | CAB-O-JET (trade mark) 200 (*3) |  |  | — | — | — | — | — | — | — |
|  | Glycerin |  |  | 27.0 | 27.0 | 27.0 | 27.0 | 27.0 | 27.0 | 27.0 |
|  | Dipropylene glycol-n-propyl ether |  |  | 0.9 | 0.9 | 0.9 | 0.9 | 0.9 | 0.9 | 0.9 |
|  | OLFIN (trade mark) E1010 (*1) |  |  | 0.2 | 0.2 | 0.2 | 0.2 | 0.2 | 0.2 | 0.2 |
|  | Water |  |  | balance | balance | balance | balance | balance | balance | balance |
| Evaluation | Magenta jetting stability evaluation |  |  | B | B | AA | C | AA | AA | AA |
|  | Magenta color developing properties evaluation |  |  | A | A | AA | AA | AA | AA | AA |
|  | Magenta weather resistance evaluation |  |  | AA | AA | AA | AA | B | B | B |
|  | Bleeding evaluation |  |  | N/A | AA | C | AA | AA | AA | AA |
|  | Comprehensive evaluation |  |  | NG | NG | NG | NG | NG | NG | NG |

|  |  |  |  | Comprehensive | | | | | | |
|---|---|---|---|---|---|---|---|---|---|---|
|  |  |  |  | COM. 8 | COM. 9 | COM. 10 | COM. 11 | COM. 12 | COM. 13 | COM. 14 |
| Water-based magenta ink |  |  |  | M29c | M30c | M31c | M32c | M33c | M34c | M35c |
| Water-based magenta ink composition (wt %) | Dye (1) | Dye (1-A) |  | — | — | — | — | — | — | — |
|  |  | Dye (1-B) |  | — | — | — | — | — | 2.0 | — |
|  |  | Dye (1-E) |  | — | — | — | — | — | — | — |
|  | Dye (2) | Dye (2-B) |  | — | — | — | — | — | — | 4.0 |

TABLE 3-continued

|  |  |  |  |  |  |  |  |  |
|---|---|---|---|---|---|---|---|---|
|  |  | Dye (2-C) | — | — | — | — | — | — | — |
|  |  | Dye (2-D) | — | — | — | 4.0 | — | — | — |
|  |  | Dye (2-E) | — | — | — | — | — | 2.0 | — |
|  | Dye (3) | Dye (3-C) | — | — | — | — | — | — | — |
|  |  | C.I. Acid Red 1 | — | — | — | — | — | — | — |
|  |  | C.I. Acid Red 254 | — | — | — | — | — | — | — |
|  |  | C.I. Acid Red 52 | 4.0 | — | — | — | — | — | — |
|  |  | C.I. Acid Red 289 | — | 4.0 | 4.0 | — | 4.0 | — | — |
|  |  | Glycerin | 27.0 | 27.0 | 27.0 | 27.0 | 27.0 | 27.0 | 27.0 |
|  |  | Dipropylene glycol-n-propyl ether | 2.0 | 2.0 | 4.0 | 4.5 | 2.0 | 4.5 | 3.5 |
|  |  | Triethylenglycol-n-butylether | — | — | — | — | — | — | — |
|  |  | Tripropylene glycol methyl ether | — | — | — | — | — | — | — |
|  |  | Propylene glycol-n-propyl ether | — | — | — | — | — | — | — |
|  |  | Tripropylene glycol-n-butyl ether | — | — | — | — | — | — | — |
|  |  | OLFIN (trade mark) E1010 (*1) | 0.2 | 0.2 | 0.2 | 0.2 | 0.2 | 0.2 | 0.2 |
|  |  | Water | balance | balance | balance | balance | balance | balance | balance |
| Water-based black ink |  |  | Bk1 | Bk1 | Bk1 | Bk2 | Bk2 | Bk1 | Bk1 |
| Water-based black ink composition (wt %) |  | CAB-O-JET (trade mark) 300 (*2) | 26.7 (4.0) | 26.7 (4.0) | 26.7 (4.0) | — | — | 26.7 (4.0) | 26.7 (4.0) |
|  |  | CAB-O-JET (trade mark) 200 (*3) | — | — | — | 20.0 (4.0) | 20.0 (4.0) | — | — |
|  |  | Glycerin | 27.0 | 27.0 | 27.0 | 27.0 | 27.0 | 27.0 | 27.0 |
|  |  | Dipropylene glycol-n-propyl ether | 0.9 | 0.9 | 0.9 | 0.9 | 0.9 | 0.9 | 0.9 |
|  |  | OLFIN (trade mark) E1010 (*1) | 0.2 | 0.2 | 0.2 | 0.2 | 0.2 | 0.2 | 0.2 |
|  |  | Water | balance | balance | balance | balance | balance | balance | balance |
| Evaluation |  | Magenta jetting stability evaluation | AA | AA | B | C | AA | C | A |
|  |  | Magenta color developing properties evaluation | AA | AA | AA | AA | AA | AA | AA |
|  |  | Magenta weather resistance evaluation | C | C | C | AA | C | AA | AA |
|  |  | Bleeding evaluation | AA | B | AA | AA | B | AA | B |
|  |  | Comprehensive evaluation | NG | NG | NG | NG | NG | NG | NG |

(*1): Acetylene glycol surfactant (ethylene oxide adduct (10 mol) of diol, Nissin Chemical Industry Co., Ltd.)
(*2): Self-dispersible carbon black dispersion, manufactured by Cabot Specialty Chemicals; carbon black concentration: 15% by weight, number in parenthesis indicates pigment solid content amount
(*3): Self-dispersible carbon black dispersion, manufactured by Cabot Specialty Chemicals; carbon black concentration: 20% by weight, number in parenthesis indicates pigment solid content amount As shown in Table 2, water-based ink sets of Examples 1 to 21 showed favorable results ("A" or "AA") in all of the magenta jetting stability evaluation, the magenta color developing properties evaluation, the magenta weather resistance evaluation, and the bleeding evaluation. Therefore, each comprehensive evaluation was "G". In particular, the result of the magenta color developing properties evaluation was excellent ("AA") in each of Examples 9 to 21 in which the dye represented by the general formula (2), the dye represented by the general formula (3), C. I. Acid Red 1, or C. I. Acid Red 254 was used besides the dye represented by the general formula (1). Out of these examples, the results of the magenta color developing properties evaluation and the magenta light resistance evaluation were both especially excellent "AA" in examples 9 and 14 to 17 in which the dye represented by general formula (2) was used besides the dye represented by the general formula (1).

On the other hand, as shown in Table 3, although the dye represented by the general formula (1) was used in the water-based magenta ink, the result of the magenta jetting stability evaluation was inferior ("B") in the water-based ink set of Comparative Example 1. Further, since the water-based black ink was not mixed with the water-based magenta ink, it was not possible to carry out the bleeding evaluation. The reason thereof is considered that the proportion of the penetrant in the water-based magenta ink was small, i.e. 0.2% by weight.

Each of the water-based ink sets of Comparative examples 2 and 13 was same as or equivalent to that of Comparative example 1 in that the dye represented by the general formula (1) was used in the water-based magenta ink. However, the proportion of the penetrant in the water-based magenta ink of Comparative example 2 was increased to 4.0% by weight, and the proportion of the penetrant in the water-based magenta ink of Comparative example 13 was increased to 4.5% by weight. As a result, although the results of the bleeding evaluation were excellent ("AA") in Comparative examples 2 and 13, the results of the magenta jetting stability evaluation were inferior ("B" in Comparative example 2, "C" in Comparative example 13).

In the water-based ink set of Comparative Example 3, the result of the bleeding evaluation was significantly inferior ("C"). The reason thereof is considered that the magenta colorant contained in the water-based magenta ink of Comparative example 3 was the dye represented by the general formula (2) and did not contain the dye represented by the general formula (1). In the water-based ink set of Comparative example 14, the dye represented by the general formula (2) was used in the water-based magenta ink as in the same manner as Comparative example 3, and the proportion of the penetrant in the water-based magenta ink was increased to 3.5% by weight. As a result, in Comparative example 14, the result of the bleeding evaluation was slightly improved ("B"), which was insufficient. In the water-based ink set of Comparative example 4, the dye represented by the general formula (2) was used in the water-based magenta ink as in the same manner as Comparative example 3, and the proportion of the penetrant in the water-based magenta ink was increased to 4.5% by weight. As a result, in Comparative example 4, although the result of the bleeding evaluation was improved ("AA"), the result of the magenta jetting stability evaluation was significantly inferior ("C"). The water-based ink set of Comparative example 11 is same as or equivalent to that of Comparative example 4 in that the dye represented by the general formula (2) was used in the water-based magenta ink and the proportion of the penetrant in the water-based magenta ink was increased to 4.5% by weight. However, the type of self-dispersible carbon black of the water-based black ink was changed from that of Comparative example 4. As a result, in Comparative example 11, even when the type of self-dispersible carbon black was changed, the result of the bleeding evaluation was excellent ("AA"). However, the result of the magenta jetting stability evaluation was significantly inferior ("C") as in the case of Comparative example 4.

In the water-based ink sets of Comparative examples 5 to 7, the results of the magenta weather resistance evaluation were inferior ("B"). The reason thereof is considered that the magenta colorant contained in the water-based magenta ink was the dye represented by the general formula (3), C. I. Acid Red 1, or C. I. Acid Red 254 and did not contain the dye represented by the general formula (1).

In the water-based ink set of Comparative example 8, the result of the magenta weather resistance evaluation was significantly inferior ("C"). The reason thereof is considered that the magenta colorant contained in the water-based magenta ink was C. I. Acid Red 52 and did not contain the dye represented by the general formula (1).

In the water-based ink set of Comparative example 9, the result of the magenta weather resistance evaluation was significantly inferior ("C") and the result of the bleeding evaluation was also inferior ("B"). The reason thereof is considered that the magenta colorant contained in the water-based magenta ink was C. I. Acid Red 289 and did not contain the dye represented by the general formula (1). Further, in the water-based ink set of Comparative example 12, the type of self-dispersible carbon black of the water-based black ink was changed from that of Comparative example 9. Also in Comparative example 12, the result of the magenta weather resistance evaluation was significantly inferior ("C") and the result of the bleeding evaluation was inferior ("B") as in the case of Comparative example 9. Furthermore, in Comparative example 10, the proportion of the penetrant in the water-based magenta ink was increased to 4.0% by weight from the 2.0% by weight in Comparative example 9. As a result, in Comparative example 10, although the result of the bleeding evaluation was improved ("AA"), the result of the magenta jetting stability evaluation was declined ("B"), and the result of the magenta weather resistance evaluation was significantly inferior ("C").

As described above, the water-based ink set of the present teaching is excellent in color developing properties, jetting stability, and weather resistance of the dye magenta ink. The water-based ink set of the present teaching hardly causes bleeding between the pigment black ink and the dye magenta ink. The usage of the water-based ink set of the present teaching is not specifically limited, and the water-based ink set of the present teaching is widely applicable to a variety of kinds of ink-jet recording.

What is claimed is:

1. A water-based ink set for ink-jet recording, comprising:
    a water-based black ink which contains a black colorant, water, and a water-soluble organic solvent, the black colorant containing self-dispersible carbon black; and
    a water-based magenta ink which contains a magenta colorant, water, and a water-soluble organic solvent, the magenta colorant containing a dye represented by the general formula (1);
    wherein the water-soluble organic solvent includes a penetrant of which amount is 0.5% by weight to 3.5% by weight of the water-based magenta ink,

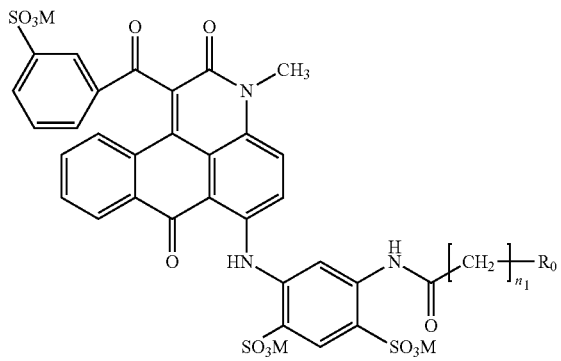

(1)

in the general formula (1), $n_1$ is 1 or 2;

Ms each represent sodium or ammonium, and are identical to or different from each other; and $R_0$ represents a monoalkylamino group having 1 to 8 carbon atoms, substituted with a carboxyl group.

2. The water-based ink set for ink-jet recording according to claim 1, wherein
    the magenta colorant further includes at least one dye selected from the group consisting of a dye represented by the general formula (2), a dye represented as the general formula (3) or a salt thereof, C. I. Acid Red 1, and C. I. Acid Red 254,

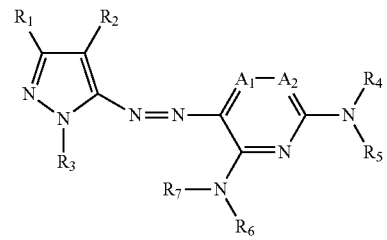

(2)

in the general formula (2), $R_1$ represents a hydrogen atom, a substituted or unsubstituted alkyl group, or a substituted or unsubstituted aryl group;

$R_2$ represents a hydrogen atom, a halogen atom, or a cyano group;

$R_3$ represents a hydrogen atom, a substituted or unsubstituted alkyl group, a substituted or unsubstituted aryl group, or a substituted or unsubstituted heterocyclic group;

$R_4$, $R_5$, $R_6$, and $R_7$ each represent a hydrogen atom, a substituted or unsubstituted alkyl group, a substituted or unsubstituted aryl group, a substituted or unsubstituted heterocyclic group, a substituted or unsubstituted sulfonyl group, or a substituted or unsubstituted acyl group, and are identical to or different from each other, not both of $R_4$ and $R_5$ are hydrogen atoms, and not both of $R_6$ and $R_7$ are hydrogen atoms; and $A_1$ and $A_2$ are both substituted or unsubstituted carbon atoms, or one of $A_1$ and $A_2$ is a substituted or unsubstituted carbon atom and the other is a nitrogen atom,

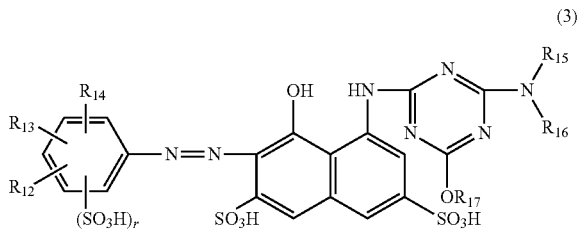

(3)

in the general formula (3), r is 0, 1, or 2;

$R_{12}$, $R_{13}$, and $R_{14}$ each represent a substituted or unsubstituted alkyl group, a substituted or unsubstituted alkoxy group, a halogen atom, a hydrogen atom, a hydroxyl group, a substituted or unsubstituted carbamoyl group, a substituted or unsubstituted sulfamoyl group, a substituted or unsubstituted amino group, a nitro group, a sulfonic acid ester group, a substituted or unsubstituted alkylsulfonyl group, a substituted or unsubstituted arylsulfonyl group, a carboxyl group, or a carboxylic acid ester group, and are identical to or different from each other; and $R_{15}$, $R_{16}$, and $R_{17}$ each represent a hydrogen atom, a substituted or unsubstituted alkyl group, a substituted or unsubstituted alkenyl group, a substituted or unsubstituted aryl group, a substituted or unsubstituted aralkyl group, a substituted or unsubstituted alicyclic group, or a substituted or unsubstituted heterocyclic group, and are identical to or different from each other.

3. The water-based ink set for ink-jet recording according to claim 1, wherein the penetrant is at least one selected from the group consisting of dipropylene glycol-n-propyl ether, triethylene glycol-n-butyl ether, tripropylene glycol methyl ether, propylene glycol-n-propyl ether, and tripropylene glycol-n-butyl ether.

4. The water-based ink set for ink jet recording according to claim 2, wherein, in the general formula (2), $R_1$ is an alkyl group; $R_2$ is a cyano group; $R_3$ is a hydrogen atom or a substituted or unsubstituted heterocyclic group; $R_4$ is a hydrogen atom, a substituted or unsubstituted heterocyclic group, or a substituted aryl group; $R_5$ and $R_6$ each are a substituted heterocyclic group or a substituted aryl group; $R_7$ is a hydrogen atom; $A_1$ is a substituted carbon atom; and $A_2$ is a substituted or unsubstituted carbon atom.

5. The water-based ink set for ink-jet recording according to claim 4, wherein, in the general formula (2), $R_1$ is a tert-butyl group; $R_3$ is a hydrogen atom, or a benzothiazolyl group optionally substituted by a sulfo group or by an alkali metal sulfonate group; $R_4$ is a hydrogen atom, a benzothiazolyl group optionally substituted by a sulfo group or by an alkali metal sulfonate group, or a trialkylphenyl group substituted by a sulfo group or by an alkali metal sulfonate group; $R_5$ and $R_6$ each are a monoalkylphenyl group, a dialkylphenyl group, or a trialkylphenyl group, or a benzothiazolyl group substituted by a sulfo group or by an alkali metal sulfonate group, the monoalkylphenyl group, the dialkylphenyl group, and the trialkylphenyl group being optionally substituted by a sulfo group or by an alkali metal sulfonate group; $A_1$ is a carbon atom substituted by an alkyl group; and $A_2$ is a carbon atom optionally substituted by a cyano group.

6. The water-based ink set for ink-jet recording according to claim 5, wherein, in the general formula (2), $R_3$ is a hydrogen atom, or a benzothiazole-2-yl group optionally substituted by a sulfo group or by an alkali metal sulfonate group; $R_4$ is a hydrogen atom, a benzothiazole-2-yl group optionally substituted by a sulfo group or by an alkali metal sulfonate group, or a mesityl group substituted by a sulfo group or by an alkali metal sulfonate group; $R_5$ and $R_6$ each are a p-octylphenyl group or a mesityl group optionally substituted by a sulfo group or by an alkali metal sulfonate group, or a benzothiazole-2-yl group substituted by a sulfo group or by an alkali metal sulfonate group; $A_1$ is a carbon atom substituted by a methyl group; and $A_2$ is a carbon atom optionally substituted by a cyano group.

7. The water-based ink set for ink-jet recording according to claim 2, wherein, in the general formula (3), r is 0; $R_{12}$ is a carboxyl group, a carbamoyl group, a trifluoromethyl group, or a sulfamoyl group; $R_{13}$ and $R_{14}$ each are a hydrogen atom; $R_{15}$ is a phenyl group optionally substituted by a carboxyl group or a sulfamoyl group, or a carboxy alkyl group; $R_{16}$ is a hydrogen atom; and $R_{17}$ is a hydrogen atom or an alkyl group.

8. An ink jet recording method for performing recording on a recording media comprising discharging, onto the recording medium, the water-based black ink and the water-based magenta ink of the water-based ink set for ink-jet recording as defined in claim 1.

9. An ink-jet recording apparatus which performs recording on a recording medium comprising:

an ink-set accommodating section which accommodates the water-based ink set for ink-jet recording as defined in claim 1; and an ink discharge mechanism which discharges, onto the recording medium, each of the water-based black ink and the water-based magenta ink of the water-based ink set for ink-jet recording.

* * * * *